United States Patent
Wakai

(10) Patent No.: US 10,691,832 B2
(45) Date of Patent: Jun. 23, 2020

(54) APPLICATION CONTROL SYSTEM AND APPLICATION CONTROL METHOD

(71) Applicant: Panasonic Intellectual Property Management Co., Ltd., Osaka (JP)

(72) Inventor: Ryohei Wakai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 182 days.

(21) Appl. No.: 15/742,465

(22) PCT Filed: Jun. 20, 2016

(86) PCT No.: PCT/JP2016/002941
§ 371 (c)(1),
(2) Date: Jan. 5, 2018

(87) PCT Pub. No.: WO2017/017889
PCT Pub. Date: Feb. 2, 2017

(65) Prior Publication Data
US 2018/0189507 A1 Jul. 5, 2018

(30) Foreign Application Priority Data
Jul. 29, 2015 (JP) ................................ 2015-150132

(51) Int. Cl.
*G06F 21/00* (2013.01)
*G06F 21/62* (2013.01)
(Continued)

(52) U.S. Cl.
CPC ............ *G06F 21/629* (2013.01); *G06F 21/12* (2013.01); *G06F 21/44* (2013.01); *H04L 9/08* (2013.01);
(Continued)

(58) Field of Classification Search
CPC ......... G06F 21/629; G06F 21/12; G06F 21/44
(Continued)

(56) References Cited

U.S. PATENT DOCUMENTS

2006/0277406 A1 12/2006 Hashimoto et al.
2009/0241107 A1 9/2009 Kobayashi
(Continued)

FOREIGN PATENT DOCUMENTS

JP 2006-166279 A 6/2006
JP 2006-352834 A 12/2006
(Continued)

*Primary Examiner* — Anthony D Brown
(74) *Attorney, Agent, or Firm* — Seed IP Law Group LLP

(57) ABSTRACT

Provided is an application control system capable of improving the safety and operability of application control, by a control device that makes a control request for an application, over a terminal device. The application control system includes a terminal device and a management device, which are connected with each other through a network. The management device generates a control key for controlling an application for the terminal device, and transmits the control key to the terminal device and the control device. The terminal device receives and retains the control key from the management device, receives the control key and the control request from the control device, and controls the application for the terminal device corresponding to the control key, in response to the control request, in a case where the retained control key and the control key from the control device match one another.

20 Claims, 29 Drawing Sheets

(51) Int. Cl.
*G06F 21/12* (2013.01)
*G06F 21/44* (2013.01)
*H04L 9/08* (2006.01)
*H04M 11/00* (2006.01)
*G06F 11/30* (2006.01)
*H04M 11/02* (2006.01)

(52) U.S. Cl.
CPC ............ *H04L 9/088* (2013.01); *H04M 11/00* (2013.01); *G06F 11/3003* (2013.01); *H04M 11/025* (2013.01)

(58) Field of Classification Search
USPC .......................................................... 726/4
See application file for complete search history.

(56) References Cited

U.S. PATENT DOCUMENTS

| | | | |
|---|---|---|---|
| 2011/0276501 A1 | 11/2011 | Sako et al. | |
| 2013/0050736 A1 | 2/2013 | Akahira et al. | |
| 2013/0311289 A1* | 11/2013 | Nakabayashi | G06Q 30/02 705/14.54 |
| 2015/0009020 A1* | 1/2015 | Shekhar | G08C 17/02 340/12.5 |

FOREIGN PATENT DOCUMENTS

| | | |
|---|---|---|
| JP | 2009-205262 A | 9/2009 |
| JP | 2009-230422 A | 10/2009 |
| JP | 2010-211784 A | 9/2010 |
| JP | 2013-45315 A | 3/2013 |

\* cited by examiner

| USER ID | MAIL ADDRESS | PASSWORD |
|---|---|---|
| 1001 | xxx@xxx.com | xxx |
| 1002 | yyy@yyy.com | yyy |
| ... | ... | ... |

FIG. 8

| CAMERA ID | URL | USER ID | CAMERA NAME |
|---|---|---|---|
| 1101 | http://xxx.xxx.xxx.001/camera.cgi | 1001 | ENTRANCE CAMERA |
| 1102 | http://xxx.xxx.xxx.002/camera.cgi | 1001 | EXIT CAMERA |
| 1103 | http://xxx.xxx.xxx.003/camera.cgi | 1001 | BOX LUNCH CORNER CAMERA |
| 1104 | http://xxx.xxx.xxx.004/camera.cgi | 1001 | DRINK CORNER CAMERA |
| ... | ... | ... | ... |

| App PROVIDER ID | MAIL ADDRESS | PASSWORD |
|---|---|---|
| 2001 | xxx@pppp.com | xxxxxxxx |
| 2002 | yyy@qqqq.com | yyyyyyyy |
| ... | ... | ... |

| AppID | App NAME | App DESCRIPTION | App PROVIDER ID | App SERVER AUTHENTICATION KEY |
|---|---|---|---|---|
| 2101 | People Count | COUNT NUMBER OF PEOPLE, AND CALCULATE STATISTICAL INFORMATION FOR EACH TIME ZONE, EACH DAY OF WEEK, EACH MONTH, AND THE LIKE | 2002 | qazwsxedcrfvtgb |
| 2102 | Customer Analisys | CALCULATE CUSTOMER BASE (GENDER, AGE, AND ESTIMATED JOB) AND STATISTICAL INFORMATION OF ROAD LINE IN STORE | 2001 | okmijnuhbygvtfc |
| ... | ... | ... | ... | ... |

| CONTRACT ID | USER ID | AppID | CONTRACT AUTHENTICATION KEY | CamApp CONTROL KEY |
|---|---|---|---|---|
| 3001 | 1001 | 2101 | asdfghjklasdfghjklasdfghjkl | poiuytrewqpoiuytrewq |
| 3002 | 1001 | 2102 | qwertyuiqwertyuiqwertyui | lkjhgfdsalkjhgfdsalk |
| ... | ... | ... | ... | ... |

| CamApp CONTROL KEY ID | CONTRACT ID | CAMERA ID | CamApp CONTROL KEY |
|---|---|---|---|
| 3101 | 3001 | 1101 | qwqwqwqwqwqwqw |
| 3102 | 3001 | 1102 | asasasasasasasasa |
| 3103 | 3001 | 1103 | zxzxzxzxzxzxzxzx |
| 3104 | 3002 | 1101 | ererererererer |
| ... | ... | ... | ... |

SELECT CAMERA TO USE IN App "CUSTOMER ANALYSIS APPLICATION" FROM YOUR CAMERA NAME LIST

- ☑ - ENTRANCE CAMERA
- ☑ - EXIT CAMERA
- ☐ - BOX LUNCH CORNER CAMERA
- ☑ - DRINK CORNER CAMERA
- ☐ - CAMERA IN FRONT OF TOILET
- ☐ - CLERK ENTRANCE CAMERA

[ RETURN ]　[ SELECT ]

FIG. 24

| CamAppID | CamApp NAME | AppID | PackageFilePath |
|---|---|---|---|
| 2201 | PeopleCountCamApp | 2101 | /PackageFile/2201 |
| 2202 | CustomerAnalisysEntryCamApp | 2102 | /PackageFile/2202 |
| 2203 | CustomerAnalisysExitCamApp | 2102 | /PackageFile/2203 |
| 2204 | CustomerAnalisysOtherCamApp | 2102 | /PackageFile/2204 |
| ... | ... | ... | ... |

| Installed CamAppID | CONTRACT ID | CamAppID | CAMERA ID | INSTALLATION ID |
|---|---|---|---|---|
| 3201 | 3001 | 2201 | 1101 | 0001 |
| 3202 | 3002 | 2202 | 1101 | 0002 |
| 3203 | 3002 | 2203 | 1102 | 0001 |
| 3204 | 3002 | 2204 | 1103 | 0001 |
| 3205 | 3002 | 2204 | 1104 | 0001 |
| ... | ... | ... | ... | ... |

| CONTRACT ID | USER ID | AppID | CONTRACT AUTHENTICATION KEY |
|---|---|---|---|
| 3001 | 1001 | 2101 | asdfghjklasdfghjklasdfghjkl |
| 3002 | 1001 | 2102 | qwertyuiqwertyuiqwertyui |
| ... | ... | ... | ... |

| CamAppCONTROLAUTHORITYID | CONTRACTID | CAMERA ID |
|---|---|---|
| 3101 | 3001 | 1101 |
| 3102 | 3001 | 1102 |
| 3103 | 3001 | 1103 |
| 3104 | 3002 | 1101 |
| ... | ... | ... |

APPLICATION CONTROL SYSTEM AND APPLICATION CONTROL METHOD

TECHNICAL FIELD

The present disclosure relates to an image capture system and an application control method.

BACKGROUND ART

In the related art, when an application is installed in a device (execution device) that executes an application, a server (storage server) manages an application program and an application package (hereinafter, simply referred to as an application), and the storage server may supply the application to the execution device. The execution device installs and executes the supplied application.

As a system handling an application in the related art, it has been known that in a multifunction peripheral in which a license file is embedded, if the license file is passed to the server and is designated according to the user's operation, the server installs an application in the multifunction peripheral by using the designated license file (for example, see PTL 1).

Further, it has been known that an external terminal, an internal terminal, and an application server are registered in a management server, and the application server and the internal terminal establish an encrypted communication path therebetween using an encrypted communication key received from the management server (for example, see PTL 2).

There is also a system that accumulates images captured by an image capture device in an image recording device and distributes the images to an image distribution device as necessary. As such a system, it has been known that a key management device distributes a shared key to image distribution devices and an image reproduction device, and an image recording device receives images distributed from the plurality of image distribution devices, and distributes the images to an image reproduction device (for example, see PTL 3).

CITATION LIST

Patent Literature

PTL 1: Japanese Patent Unexamined Publication No. 2009-205262
PTL 2: Japanese Patent Unexamined Publication No. 2006-352834
PTL 3: Japanese Patent Unexamined Publication No. 2006-166279

SUMMARY OF THE INVENTION

It is assumed that the execution device is applied to an image capture device that captures an image, and the application is applied to an application used by the image capture device (camera application). In this case, with the techniques described in PTLs 1 to 3, the safety and operability of application control over the image capture device by the application server is insufficient. This also applies to a case where the execution device is applied to a terminal device that performs various processes and the application is applied to the application used by the terminal device.

The present disclosure has been made in view of the above problems, and provides an application control system and an application control method capable of improving the safety and operability of application control, by a control device that makes a control request for an application, over a terminal device.

An application control system of the present disclosure is an application control system including a terminal device; and a management device that manages control over an application for the terminal device, the terminal device; and the management device being connected with each other through a network, in which the management device generates a control key for controlling the terminal device application, and transmits the control key, to the terminal device, and a control device that retains the application for the terminal device and makes a control request for the application for the terminal device, and the terminal device receives and retains the control key from the management device, receives the control key and the control request from the control device, determines whether or not the retained control key and the control key from the control device match one another, and in a case where the control keys match one another, controls the application for the terminal device corresponding to the control key, in response to the control request.

The application control method of the present disclosure is a method in an application control system in which a terminal device and a management device that manages control over an application for the terminal device are connected with each other through a network. In this method, a control key for controlling an application for the terminal device is generated by the management device, the control key is transmitted to the terminal device, and a control device that retains the application for the terminal device and makes a control request for the application for the terminal device, by the management device, the control key is received and retained from the management device, by the terminal device, the control key and the control request are received from the control device, by the terminal device, whether or not the retained control key and the control key from the control device match one another is determined by the terminal device, and in a case where the control keys match one another, the application for the terminal device corresponding to the control key is controlled in response to the control request, by the terminal device.

According to the present disclosure, it is possible to improve the safety and operability of application control, by a control device that makes a control request for an application, over a terminal device. For example, a mechanism in which a control device controls a terminal device by using an application can be realized safely and easily for a user.

BRIEF DESCRIPTION OF DRAWINGS

FIG. 8 is a schematic diagram showing an example of registered contents of a table in which camera information managed by the management server in the first exemplary embodiment is registered.

FIG. 9 is a schematic diagram showing an example of registered contents of a table in which App provider information managed by the management server in the first exemplary embodiment is registered.

FIG. 10 is a schematic diagram showing an example of registered contents of a table in which App information managed by the management server in the first exemplary embodiment is registered.

FIG. 11 is a schematic diagram showing an example of registered contents of a table in which contract information managed by the management server in the first exemplary embodiment is registered.

FIG. 12 is a schematic diagram showing an example of registered contents of a table in which information on a CamApp control key managed by the management server in the first exemplary embodiment is registered.

FIG. 16 is a schematic diagram showing an example of a GUI screen in the first exemplary embodiment.

FIG. 24 is a schematic diagram showing an example of registered contents of a table in which CamApp information managed by the management server in the second exemplary embodiment is registered.

FIG. 25 is a schematic diagram showing an example of registered contents of a table in which installed CamApp information managed by the management server in the second exemplary embodiment is registered.

FIG. 26 is a schematic diagram showing an example of registered contents of a table in which contract information managed by the management server in the second exemplary embodiment is registered.

FIG. 27 is a schematic diagram showing an example of registered contents of a table in which information on CamApp control authority managed by the management server in the second exemplary embodiment is registered.

DESCRIPTION OF EMBODIMENTS

Hereinafter, exemplary embodiments will be described with reference to the drawings.

(Background to the Achievement of One Aspect of the Present Disclosure)

As a surveillance camera system, a system in which an application server (hereinafter, also referred to as an App server) controls a plurality of cameras (image capture devices) through a network is assumed. In the surveillance camera system, for example, the App server installs a camera application (hereinafter, referred to as CamApp) in each camera.

In the surveillance camera system, for example, it is assumed that the master key of a camera is registered in the application server, and access is made while security is secured between the camera and the App server using the master key.

However, in such a surveillance camera system, safety and operability are insufficient. For example, since the App server retains the master key of a camera even after CamApp's contract is over, the camera can be controlled using CamApp even if the techniques of PTLs 1 and 2 are used. On the other hand, it is difficult for the camera's owner to delete or change the master key which is once registered in the camera.

Further, in a case where the master key is leaked out, camera control using the CamApp may be possible from another App server. Therefore, it is desirable that camera control using the CamApp becomes impossible after contract of an application including the CamApp is completed.

Further, it is difficult to control the access authority to the camera by the App server. For example, it is difficult to designate an App server to give control authority of which CamApp to which camera.

The above situation is not limited to the camera and CamApp, and the same applies to various terminal devices and the application for a terminal device.

The following describes an application control system and an application control method capable of improving the safety and operability of an application control, by a control device that makes a control request to an application, over a terminal device.

The application control system of the following exemplary embodiments are applied to, for example, a surveillance camera system which monitors persons entering and exiting a store.

First Exemplary Embodiment

Figure 1:
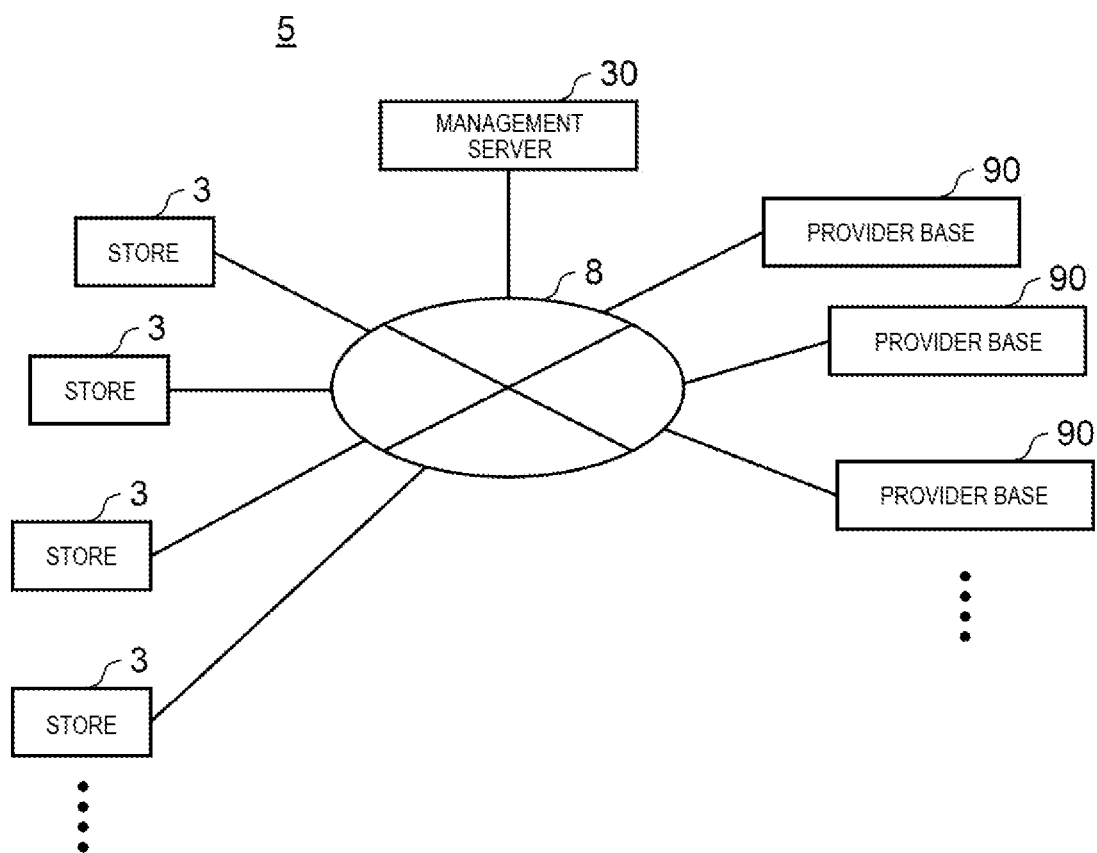
FIG. 1 is a schematic diagram showing a configuration example of a camera system in a first exemplary embodiment.
Figure 2:
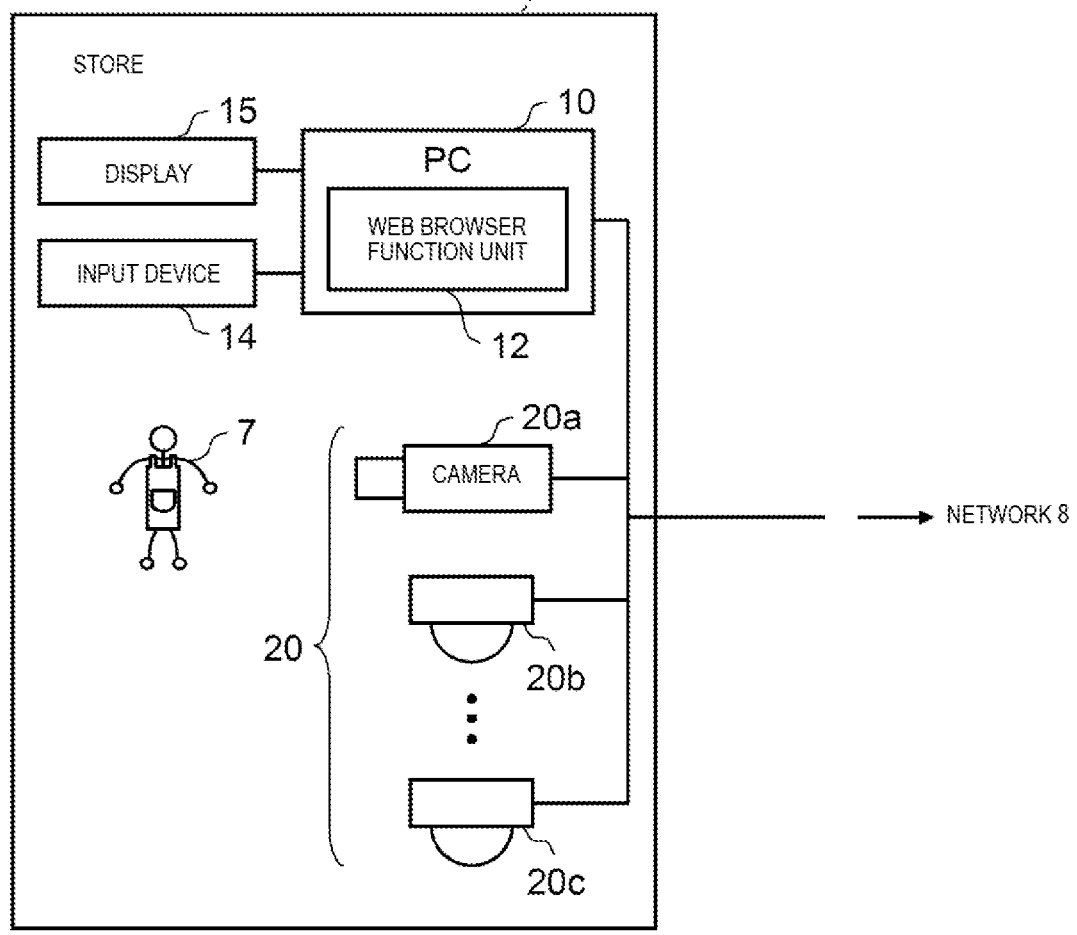
FIG. 2 is a schematic diagram showing a configuration example of each device disposed in a store in the first exemplary embodiment.
Figure 3:
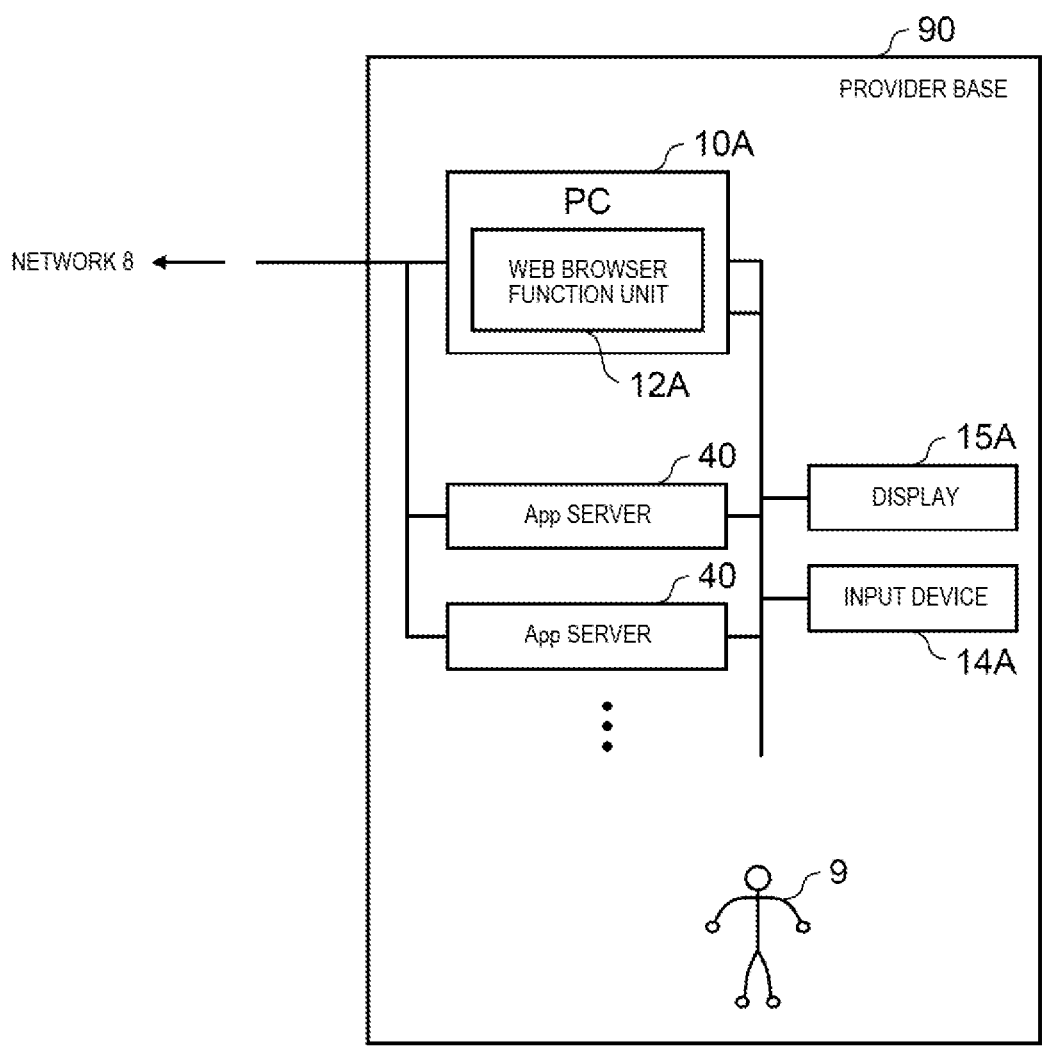
FIG. 3 is a schematic diagram showing a configuration example of each device disposed in a provider base in the first exemplary embodiment.

FIG. 1 is a schematic diagram showing a configuration example of camera system 5 in a first exemplary embodiment. FIG. 2 is a schematic diagram showing a configuration example of each device disposed in store 3. FIG. 3 is a schematic diagram showing a configuration example of each device disposed in provider base 90.

Camera system 5 includes each device disposed in management server 30, each device disposed in store 3, and each device disposed in provider base 90. For example, PC 10, input device 14, display 15, and one or more cameras 20a, 20b, and 20c are disposed in store 3. For example, PC 10A, input device 14A, display 15A, and one or more application (App) server 40 are disposed in provider base 90. Incidentally, the numbers of cameras and App servers 40 are not limited to the examples of FIG. 1 to FIG. 3.

In camera system 5, for example, plural types of cameras 20a, 20b, and 20c, and PC 10 placed in store 3 are connected to network 8 such as the Internet. When there is no need to particularly distinguish individual cameras 20a, 20b, and 20c, they are collectively referred to as camera 20. Camera 20 may be placed in locations other than stores (for example, outdoor fairgrounds and toll roads). PC 10 is used by, for example, user 7 in store 3.

In camera system 5, management server 30 and App server 40 are connected to network 8. Devices included in camera system 5 can communicate data with each other through network 8. The communication path using network 8 may be, for example, a communication path encrypted with a secure sockets layer (SSL). In this case, the security of the data to be communicated is improved.

In camera system 5, PC 10A is connected to network 8. PC 10A is used, for example, for App provider 9.

PCs 10 and 10A each include, for example, a central processing unit (CPU) or a digital signal processor (DSP), a read only memory (ROM), or a random access memory (RAM). The CPU or the DSP executes various programs (for example, an operating system (OS), a middleware program, and an application program) retained in the ROM or the RAM to realize various functions of PCs 10 and 10A. PCs 10 and 10A download, install, and execute, for example, various applications.

PCs 10 and 10A each include, for example, a communication interface for communicating with another communication devices, an input and output interface for inputting and outputting data, and a user interface.

PC 10 includes Web browser function unit 12, input device 14 and display 15. PC 10A includes Web browser function unit 12A, and input device 14A and display 15A. Web browser function units 12 and 12A each have the function of Web browser, download an application (for example, HyperText Markup Language (HTML), and javascript (registered trademark)) from, for example, a Web server, and execute it.

User 7 is, for example, a user who uses the application after receiving the application for camera 20 (a camera application: CamApp). App provider 9 is, for example, a provider that generates and provides CamApp.

Web browser function unit 12 of PC 10 accesses, for example, App server 40 from a Web browser, and executes a Web application (for example, HTML, Javascript (registered trademark) provided by a Web server). With the Web application, PC 10 receives the service by a function provided by CamApp or the function provided by the App corresponding to CamApp (for example, display of a captured image, and display of statistical information based on the metadata derived from the captured image). For example, user 7 (for example, the owner of store 3) uses PC 10 to purchase a desired App from management server 30 that manages the App store, thereby installing CamApp corresponding to an App in camera 20 by the operation of camera system 5. Incidentally, management server 30 has the function of an App store, and App server 40 is a server developed and managed by App provider 9 in order to realize each App.

Application is used, for example, for presenting user information to a Web server and transmitting input information from the user to the Web server. Incidentally, PCs 10 and 10A does not necessarily need to have the function of the Web browser, and other applications running on PCs 10 and 10A (for example, a native application (Windows (registered trademark) application, java (registered trademark) application, ios (registered trademark) application, MacOS (registered trademark) application, or the like) may be used.

PCs 10 and 10A download, install, and execute the application. Further, as an information processing device, a smartphone or a tablet terminal may be used, instead of PCs 10 and 10A.

PC 10 and camera 20 may be provided at different positions (for example, different stores 3). Further, App server 40 may be disposed at a position other than provider base 90. In a case where there are a plurality of App servers 40, they may be distinguished by hardware, software, or hardware and software. In a case where there are a plurality of App servers 40 distinguished by hardware, App servers 40 may be placed apart (for example, at separate bases).

Figure 4:
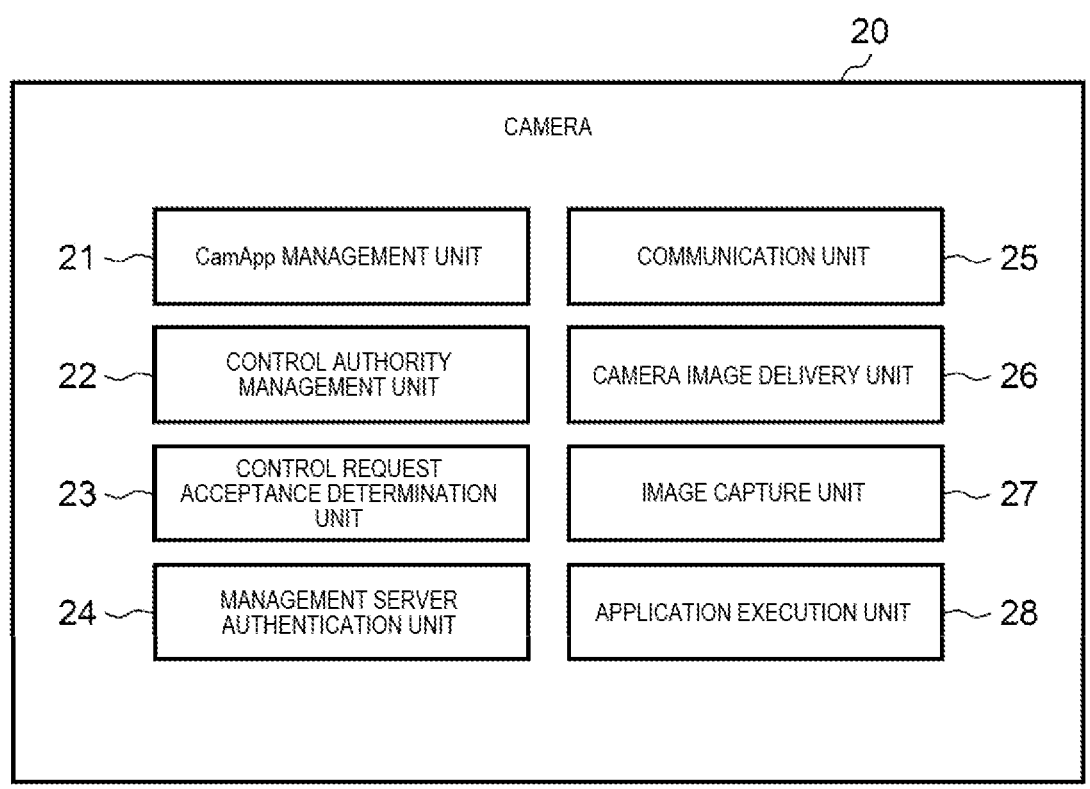
FIG. 4 is a block diagram showing a configuration example of a camera in the first exemplary embodiment.

FIG. 4 is a block diagram illustrating a configuration example of camera 20.

Camera 20 includes, for example, a CPU or a DSP, and a ROM or RAM. The CPU or the DSP executes various programs (for example, an OS, a middleware program, and an application program) retained in the ROM or the RAM to realize various functions of camera 20. Camera 20 download, install, and execute, for example, various applications.

Camera 20 includes, for example, a communication interface for communicating with another communication devices, an input and output interface for inputting and outputting data, and a user interface.

Camera 20 includes CamApp management unit 21, control authority management unit 22, control request acceptance determination unit 23, management server authentication unit 24, communication unit 25, camera image delivery unit 26, image capture unit 27, and application execution unit 28. Camera 20 is placed, for example, inside store 3 or outside store 3. Application execution unit 28 is provided in camera 20 by CamApp being installed therein.

Image capture unit 27 captures an image. Application execution unit 28 generates metadata from the image (captured image) captured by image capture unit 27 based on, for example, a known method. The metadata includes information of, for example, face feature, age, gender, dress, time (for example, imaging time or meta data generation time), and appearance.

CamApp management unit 21 controls and manages installation, uninstallation, activation, and termination of CamApp. CamApp management unit 21 manages CamApp, in response to, for example, a CamApp control request. This control request includes, for example, a request for CamApp installation, uninstallation, activation, termination, and update.

Control authority management unit 22 receives a change request for CamApp control authority from management server 30, and manages the CamApp control authority for each CamApp, according to the change request. The change request includes, for example, a setting request and a discard request of CamApp control authority. Here, the CamApp control authority is the CamApp control key generated by management server 30. The CamApp control authority may be managed for each contract or for each contract and camera 20.

Control request acceptance determination unit 23 receives the CamApp control request from App server 40, and determines whether or not the CamApp control request is a request from App server 40 having legitimate authority. In the case of a CamApp control request from legitimate App server 40, a process according to the CamApp control request is executed by CamApp management unit 21. For example, in a case where the CamApp control key retained by control authority management unit 22 matches the CamApp control key from App server 40, it is determined to be a legitimate CamApp control request.

Management server authentication unit 24 authenticates management server 30, and guarantees that requests and instructions from management server 30 are legitimate. For example, management server 30 can be authenticated by embedding an authentication key (for example, a CamApp control authority control key (master key)) of management server 30 at the time of manufacturing camera 20.

Communication unit 25 communicates various types of information and data. Communication unit 25 receives, for example, a CamApp control request from management server 30 or App server 40.

Camera image delivery unit 26 acquires, for example, a camera picture (captured image) captured by image capture unit 27 in response to a request from each CamApp, and sends the camera picture to CamApp. Application execution unit 28 executes CamApp and generates metadata based on the camera image.

Figure 5:
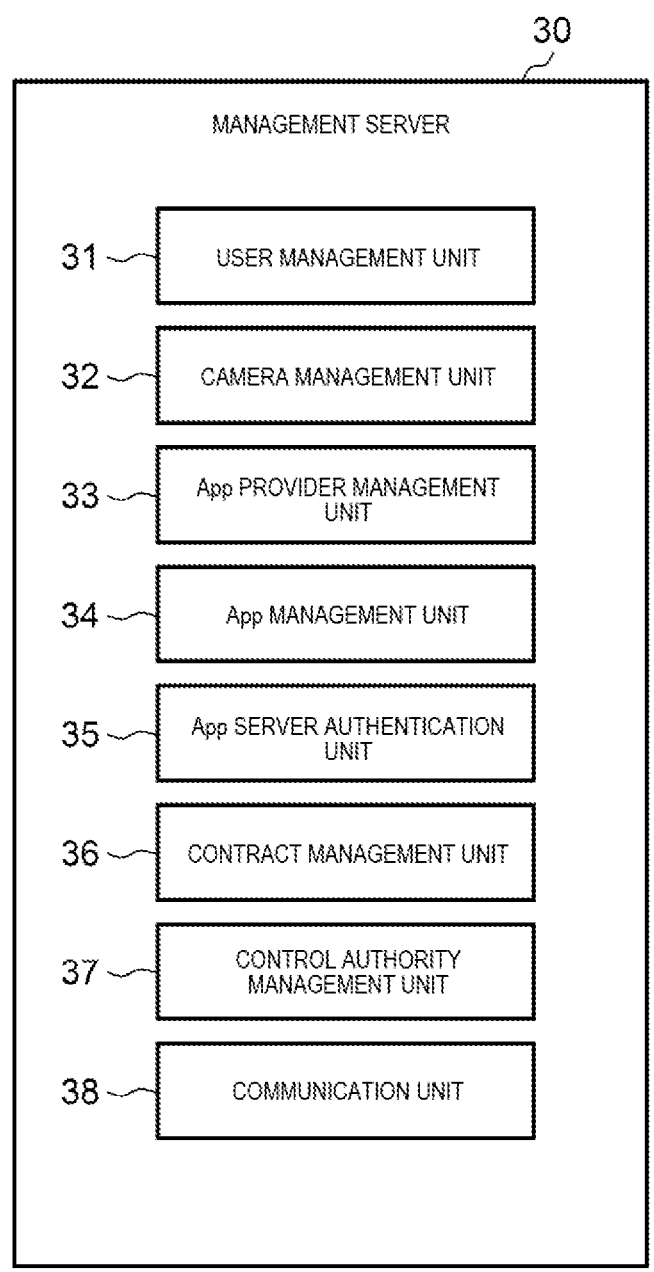
FIG. 5 is a block diagram showing a configuration example of a management server in the first exemplary embodiment.

FIG. 5 is a block diagram illustrating a configuration example of management server 30.

Management server 30 manages, for example, a plurality of users 7, a plurality of App providers 9, a plurality of cameras 20 for each of users 7, a plurality of Apps for each App provider 9, and one App server 40 and a plurality of CamApps for each App.

Management server 30 includes, for example, a CPU or a DSP, and a ROM or RAM. The CPU or the DSP executes various programs (for example, an OS, a middleware program, and an application program) retained in the ROM or the RAM to realize various functions of management server 30.

Further, management server 30 includes, for example, a communication interface for communicating with another communication devices, an input and output interface for inputting and outputting data, and a user interface.

Management server 30 manages various types of information and manages control over, for example, CamApp. Management server 30 includes user management unit 31, camera management unit 32, App provider management unit 33, App management unit 34, App server authentication unit 35, contract management unit 36, control authority management unit 37, and communication unit 38.

User management unit 31 manages user information (for example, information on the user who uses CamApp). In a case where access is made from PC 10 through the Web browser, user management unit 31 performs authentication (user authentication) with the password managed by user management unit 31. The user information is accumulated in table 51 which will be described later.

Camera management unit 32 manages information on camera 20 (for example, information on camera 20 in which CamApp is installed). The information of camera 20 includes, for example, information on the owner of camera 20. The information of camera 20 is accumulated in, for example, table 52 to be described later.

App provider management unit 33 manages the information on App provider 9 (for example, information on the App provider that provides CamApp). The information of App provider 9 is accumulated in, for example, table 53 to be described later.

App management unit 34 manages App information including the CamApp information. The App information includes, for example, information on the App provider which is the provider source. App information is accumulated in, for example, table 54.

Incidentally, the App includes, for example, CamApp which is an application for camera 20, and a server application (also referred to as ServerApp) which is an application for App server 40. The function of App is realized by combining the execution of the CamApp and the ServerApp.

App server authentication unit 35 authenticates App server 40 used for executing the App. This makes it possible to correctly deliver the CamApp control authority (CamApp control key). The authentication technique of App server 40 includes, for example, a message authentication code and a digital signature. In the message authentication code, in a case where a message authentication code (MAC) is used, for example, the key to be used is a common key. The common key is, for example, a random number having a sufficient length generated by a random number generator. In the digital signature, separate keys are used for the transmission side (for example, management server 30) and the reception side (for example. App server 40). The keys are generated by, for example, a key generation algorithm of a public key encryption method.

Contract management unit 36 manages the contract information on the contract of the App (CamApp). For example, contract management unit 36 manages which user uses which application. The contract information is accumulated in table 55 which will be described later.

Control authority management unit 37 manages an authority for controlling CamApp for camera 20 that App server 40 has, that is, CamApp control authority. Specifically, control authority management unit 37 generates and manages a CamApp control key for managing the CamApp control authority. The CamApp control key is sent to camera 20 where CamApp is installed, and sent to App server 40 which provides CamApp. The CamApp control key is used when controlling CamApp. The CamApp control key is, for example, a random number generated by a random number generator, not shown, and corresponds to a sub key.

At the time of transmission of the CamApp control request is transmitted from App server 40 to camera 20, the CamApp control key is transmitted together so that the camera 20 is App server 40 whose request transmission source is the correct CamApp control authority can be checked.

Further, control authority management unit 37 manages the information on the CamApp control key to be described later. The information on the CamApp control key is accumulated in, for example, tables 55 and 56 to be described later.

Communication unit 38 communicates various types of information and data. For example, when an access is made through Web browser function unit 12 of PC 10 in response to an instruction from user 7 or App provider 9, communication unit 38 returns HTML or Javascript (registered trademark) destined for user 7 and App provider 9 to Web browser function unit 12.

Figures 6, 7:
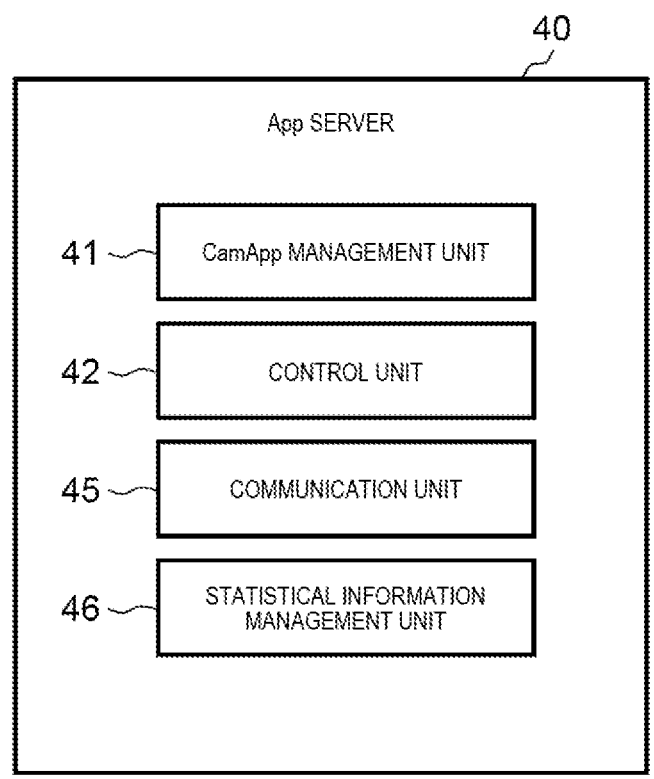
FIG. 6 is a block diagram showing a configuration example of an App server in the first exemplary embodiment.
FIG. 7 is a schematic diagram showing an example of registered contents of a table in which user information managed by the management server in the first exemplary embodiment is registered.

FIG. 6 is a block diagram illustrating a configuration example of App server 40.

App server 40 includes, for example, a CPU or a DSP, and a ROM or RAM. The CPU or the DSP executes various programs (for example, an OS, a middleware program, and an application program) retained in the ROM or the RAM to realize various functions of App server 40.

In addition. App server 40 includes, for example, a communication interface for communicating with another communication devices, an input and output interface for inputting and outputting data, and a user interface.

App server 40 controls, for example. CamApp of one or more cameras 20, collects various data (for example, metadata) from one or more cameras 20, executes ServerApp, or the like, and derives various types of statistical information. That is, App server 40 generates data with high value for user, by using the metadata collected from each camera 20, and provides it to PC 10 or the like of the user through network 8.

App server 40 includes, for example, an App server for a customer analysis App, an App server for a store clerk analysis App, and an App server for a regular customer notification App.

App server 40 includes CamApp management unit 41, control unit 42, communication unit 45, and statistical information management unit 46. App server 40 accumulates CamApp and ServerApp.

Statistical information management unit 46 collects various data (for example, metadata) from camera 20 and derives various statistical information. Statistical information management unit 46 may derive the statistical information according to the processing result of ServerApp retained by App server 40 together with the collected metadata. The result of the statistical information is sent to, for example, PC 10 through network 8, and is displayed on display 15 of PC 10. The statistical information is used for, for example, monitoring and marketing of store 3.

CamApp management unit 41 accumulates and manages CamApp information, and a CamApp Package (camera application package) to be installed in camera 20. The CamApp information includes, for example, identification information of CamApp. The CamApp Package includes, for example, the application main body of CamApp and setting information for installing and executing CamApp.

Communication unit 45 communicates various types of information and data. For example, communication unit 45 makes a request for acquisition of the CamApp control key necessary for transmitting the CamApp control request to camera 20, to management server 30. Communication unit 45 transmits, for example, the CamApp control request (for example, activation, termination, installation, uninstallation, and update requests of CamApp) and the CamApp Package to camera 20.

Figure 18:
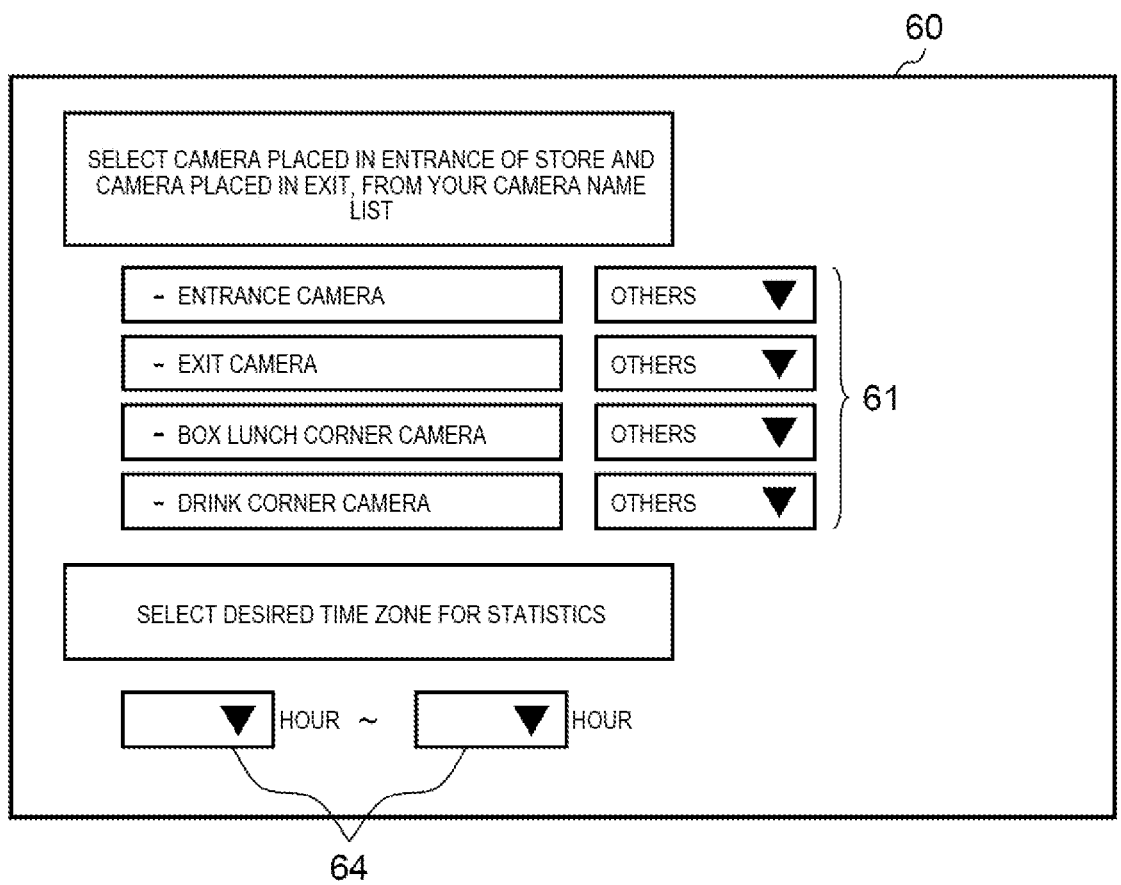
FIG. 18 is a schematic diagram showing an example of a setting GUI displayed on a display of a PC in the first exemplary embodiment.

Communication unit 45 communicates to user 7, for example, the information of the GUI for initial setting of the App and information display at the time of using the App (see for example, FIG. 18). For example, in the case of an application sending a mail to user 7 at the time of occurrence of an event, the GUI may be unnecessary. The event includes, for example, detection of a person registered in the memory in advance, a fact that the number of people in the store reaches a predetermined number of people or more, and a fact that the number of visiting customers for a predetermined time reaches the predetermined number or more.

Next, specific examples of App, CamApp, and SeverApp will be described.

Specific examples of App include, for example, a customer analysis App, a store clerk analysis App, and a shoplifter and regular customer notification App. The customer analysis App is an application for providing the road line, staying time, and the like of a customer in store 3 for each age and gender of the customer, as statistical information. The store clerk analysis App is an application for providing the store clerk's business attitude as statistical information. The shoplifter and regular customer notification App is an application for making a notification by a mail or the like, for example, when a specific person enters store 3. As the information on a specific person (for example, face feature information), the information registered by the user is registered in advance in the memory of App server 40.

Specific examples of CamApp include, for example, a face identification app, an age and gender estimation App, a posture detection App. and a face identification matching App. The face identification App is, for example, an application for obtaining face identification information (face recognition information) by performing a known face identification process (face recognition process) on a captured image. The age and gender estimation App is, for example, an application for obtaining information on age and gender, by performing a known age and gender estimation process on a captured image. Age gender includes at least one of age and gender. The posture detection App is, for example, an application for obtaining information on posture of a store clerk or the like, by performing a known posture detection process on a captured image. Posture information includes, for example, information on a standing posture, a sitting posture, and a bowing posture. The face identification matching App is, for example, an application for comparing face information which is registered in advance and face information detected by face identification (face identification matching) and obtaining a result of determination as to whether they are the same person or not.

The above CamApp is used as, for example. CamApp for an entrance of store 3, CamApp for internal use (for example, a register counter) of store 3, and CamApp for an exit of store 3.

Specific examples of the ServerApp include, for example, a customer tracking App, a statistical information calculation App, and a mail notification App. The customer tracking App is, for example, an application for tracking customer's trends in store 3, according to the results of a face identification process, an age and gender estimation process, and a posture detection process. The statistical information calculation App is an application for calculating various pieces of statistical information, based on the various types of information obtained by the CamApp. The statistical information can be derived considering various aspects such as each App, each CamApp, each camera 20, and each App contract. The mail notification App is, for example, an application for notifying a mail, when a specific person is detected by face identification matching.

For example, in a case of calculating customer tracking and statistical information as customer analysis, App server 40 collects face identification information and age and gender estimation information as meta data relating to the CamApp. Based on the collected metadata, App server 40 can derive, for example, the age of the customer, the road line of the customer in store 3, and the staying time of the customer, as statistical information. Then, App server 40 can provide the derived statistical information to the owner of store 3 or the like.

For example, in a case of calculating store clerk tracking and statistical information as store clerk analysis, App server 40 collects face identification information, posture detection information, and the like as meta data relating to the CamApp. Based on the collected metadata, App server 40 can derive, for example, the store clerk's road line and store clerk's business attitude in store 3 as statistical information. Examples of the business attitude include standing, sitting, bowing postures.

For example, when making a shoplifter notification or a regular customer notification by using a mail, App server 40 collects face identification information, matching information with the pre-registered face image, or the like, as metadata relating to CamApp. Thus, when it is detected that a specific person has entered store 3, App server 40 can notify user 7 (for example, the owner of store 3) of the fact, by a mail.

Examples of parameters included in each CamApp include the resolution of an image used for calculating a face feature amount, and a matching threshold used for a face search process.

FIG. 7 is a schematic diagram showing an example of registered contents of table 51 in which user information managed by management server 30 is registered.

Table 51 is managed by user management unit 31 in management server 30. In table 51, for example, information pieces of a user ID, a mail address, and a password are registered for each user 7 as user information.

The user ID is an example of the identification information of the user of CamApp. The mail address is the mail address used by user 7. The password is the password used by user 7. For example, user ID: "1001", a mail address: "xxx@xxx.com", and password: "xxx" are registered.

FIG. 8 is a schematic diagram showing an example of registered contents of table 52 in which camera information managed by management server 30 is registered.

Table 52 is managed by camera management unit 32 in management server 30. In table 52, for example, a camera ID, a Uniform Resource Locator (URL), a user ID, and a camera name are registered for each camera 20 as camera information.

The camera ID is an example of the identification information of camera 20 where CamApp is installed. The URL is the URL of camera 20 where CamApp is installed. The camera name is the name of camera 20 where CamApp is installed. For example, any camera name can be set through input device 14 of PC 10 by user 7.

For example, camera ID: "1101", URL: "http://xxx.xxx.xxx.001/camera, cgi", user ID:"1001", and camera name: "entrance camera" are registered.

FIG. 9 is a schematic diagram showing an example of registered contents of table 53 in which App provider information managed by management server 30 is registered.

Table 53 is managed by App provider management unit 33 in management server 30. In table 53, for example, an App provider ID, a mail address, and a password are registered for each App provider 9 as App provider information.

The App provider ID is an example of the identification information of App provider 9 that provides CamApp. The mail address is the mail address used by App provider 9 that provides CamApp. The password is the password used by App provider 9 that provides CamApp.

For example, App provider ID: "2001", a mail address: "xxx@pppp.com", and password: "xxxxxxxx" are registered.

FIG. 10 is a schematic diagram showing an example of registered contents of table 54 in which App information managed by management server 30 is registered.

Table 54 is managed by App management unit 34 in management server 30. In table 54, for example, an AppID, an App name, an App description, an App provider ID, and an App server authentication key are registered as the App information.

AppID is an example of the identification information of the App corresponding to CamApp. The App name is the name of the App corresponding to the CamApp. The App description is information describing the contents of the App corresponding to CamApp. The App provider ID is an example of the identification information of App provider 9 that provides an App corresponding to the CamApp. The App server authentication key is a key for authenticating App server 40 that provides an App corresponding to CamApp.

For example, AppID: "2101", App name: "People Count", App Description: "Count number of people, and calculate statistical information for each time zone, each day of week, each month, and the like", App provider ID: "2002", and App server authentication key: "qazwsxedcrfvtgb" are registered.

FIG. 11 is a schematic diagram showing an example of registered contents of table 55 in which contract information managed by management server 30 is registered.

Table 55 is managed by contract management unit 36 in management server 30. In table 55, for example, a contract ID, a user ID, an AppID, a contract authentication key, and a CamApp control key are registered as contract information. The contract ID is an example of identification information for identifying the contract to be provided with the App. The user ID is an example of identification information of the user as a contractor. The AppID is an example of identification information of the contracted App. The contract authentication key is a key for referring to the contract contents and the usage information of the contracted App (for example, usage history information). The CamApp control key is a control key for controlling the CamApp corresponding to the contracted App.

For example, contract ID: "3001", user ID: "1001", AppID: "2101", contract authentication key: "asdfghjklasdfghjklasdfghjkl" are registered.

In a case where table 55 is used, for example, one CamApp control key is issued for each contract. In this case, the CamApp control key is transmitted to each camera 20 owned by user 7 who made the contract of the App and is used.

Further, in a case where table 55 is used, a CamApp control key may be issued for each contract and camera. In this case, for a single contract (a single App), a separate CamApp control key is sent and used for each camera and used. In this case, management server 30 also uses table 56 shown in FIG. 12 which will be described later. Furthermore, in this case, the information of "CamApp control key" in table 55 is unnecessary.

FIG. 12 is a schematic diagram showing an example of registered contents of table 56 in which the information on the CamApp control key managed by management server 30 is registered. Table 56 and table 55 are referred to.

Table 56 is managed by control authority management unit 37 in management server 30. For example, the CamApp control key ID, the contract ID, the camera ID, and the CamApp control key are registered as information on the CamApp control key in table 56.

The CamApp control key ID is an example of identification information of the CamApp control key.

By using table 55 and table 56, one CamApp control key and CamApp control authority are determined for each one contract and one camera.

Further, user 7 may designate camera 20 used for each App through input device 14 or the like. Thus, user 7 can permit access to specific camera 20 among the respective cameras 20 possessed by user 7.

In the example of table 56, with respect to the App (App server) relating to the contract ID: 3001, control over CamApp for three cameras 20 in total identified by the camera IDs: 1101, 1102, and 1103 is permitted. With respect to the App (App server) relating to the contract ID: 3002, control over CamApp for one camera 20 in total identified by the camera ID: 1101 is permitted.

By using table 56, security can be further improved.

Next, an operation example of camera system 5 will be described.

Figure 13:
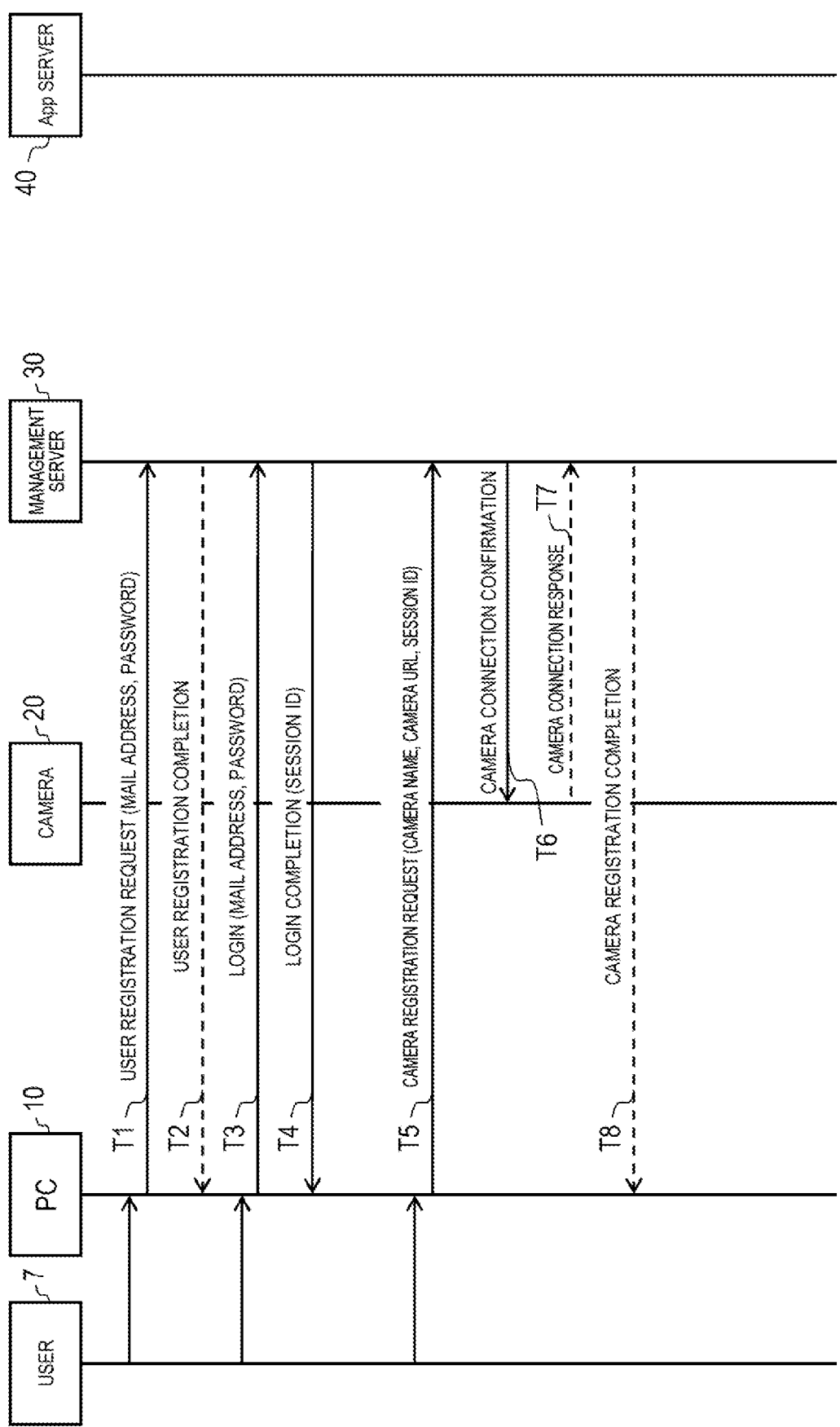
FIG. 13 is a sequence diagram showing an example of user registration and camera registration procedures by the camera system in the first exemplary embodiment.

FIG. 13 is a sequence diagram showing an example of user registration and camera registration procedures by camera system 5.

In PC 10, when user 7 requests user registration through input device 14, Web browser function unit 12 makes a user registration request to management server 30 (T1). In the user registration request, the information of the mail address and password of user 7, which is retained in PC 10 or input through input device 14, is transmitted from PC 10 to management server 30.

In management server 30, if communication unit 38 receives the user registration request from PC 10, user management unit 31 performs user registration, and communication unit 38 returns user registration completion to PC 10 (T2). In the user registration, user management unit 31 attaches a user ID for identifying user 7 based on the user registration request, and retains the user ID and information on the mail address and the password from PC 10, in table 51.

In PC 10, when user 7 inputs the mail address and password through input device 14 or the like to request login, Web browser function unit 12 transmits the mail address and password to management server 30 to request login (T3).

In management server 30, when communication unit 38 receives the login request and the mail address and password from PC 10, user management unit 31 refers to table 51 and collates the mail address and password. If the collation succeeds, that is, if there is a matching mail address and password, communication unit 38 issues a session ID and makes a notification of the login completion (T4). The session ID is managed in association with the user ID.

In PC 10, when user 7 requests camera registration through input device 14 or the like, Web browser function unit 12 makes a camera registration request to management server 30 by using the session ID (T5). In the camera registration request, the camera name and camera URL are transmitted from PC 10 to management server 30.

In management server 30, when communication unit 38 receives a camera registration request from PC 10, camera management unit 32 performs camera registration. In the camera registration, camera management unit 32 retains a camera ID for identifying camera 20 based on the camera registration request, a URL (camera URL) for accessing camera 20 through the network, the user ID which is information on the owner of camera 20, and information on the name (camera name) of camera 20 in table 52. As the user ID, the value associated with the session ID is used.

Communication unit 38 sends a connection confirmation to the camera URL designated by the camera registration request (T6). In a case where camera 20 is normally connected, communication unit 38 receives a camera connection response from camera 20 (T7). Then, communication unit 38 returns the camera registration completion to PC 10 (T8).

According to the user registration and camera registration procedures shown in FIG. 13, camera system 5 can easily set the information on user 7 and the information on camera 20 in management server 30.

Incidentally, it is illustrated at T5 that PC 10 makes a request for the camera registration to management server 30 without passing through camera 20, but PC 10 may request the camera registration to management server 30 through camera 20, based on the input of user 7. In this case, at the time of the camera registration request, information on the user ID, the password, and the camera name is sent. Even in this case, it becomes possible to access camera 20 from management server 30.

Figure 14:
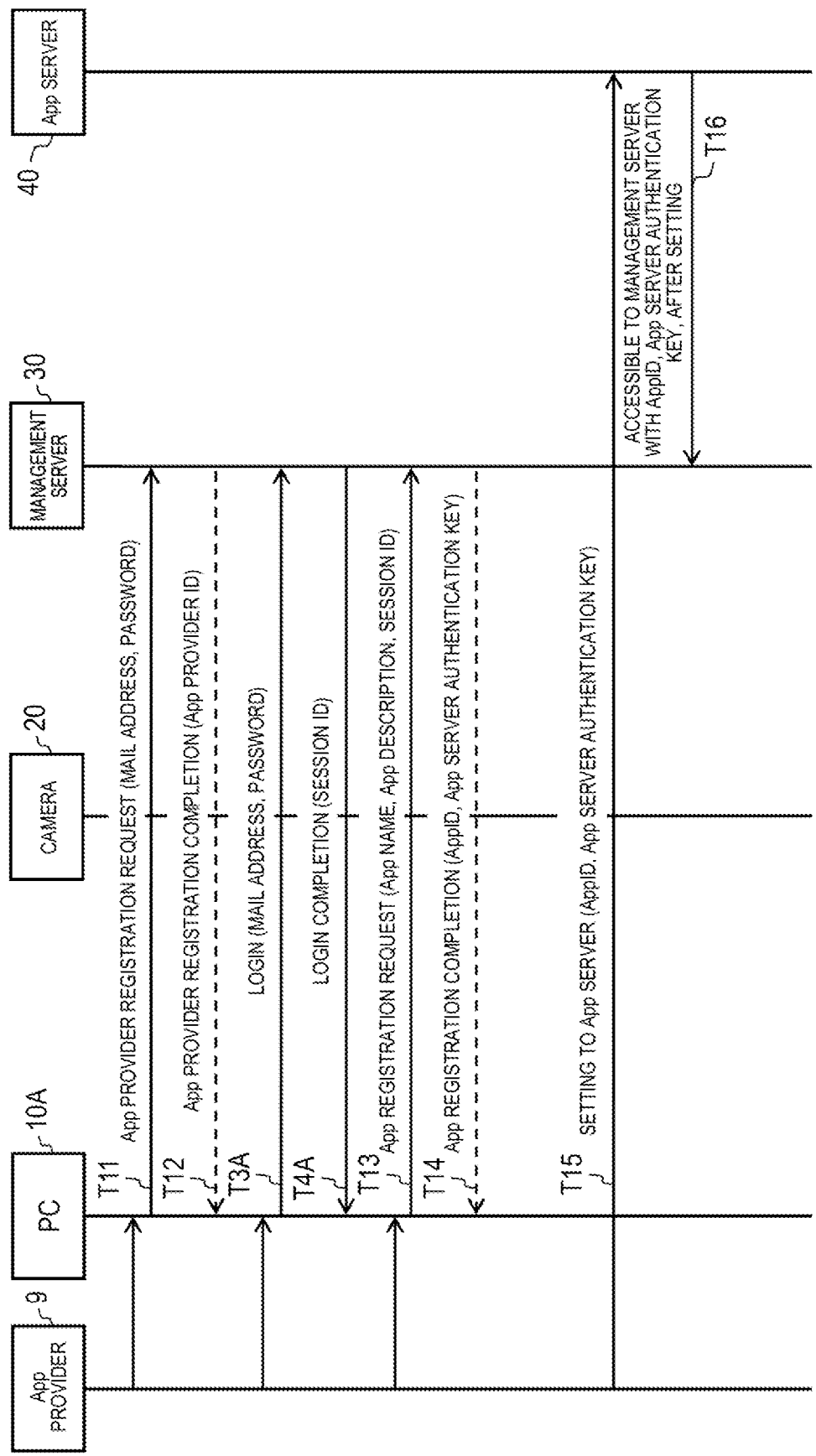
FIG. 14 is a sequence diagram showing an example of App provider registration and App registration procedures by the camera system in the first exemplary embodiment.

FIG. 14 is a sequence diagram showing an example of App provider registration and application registration procedures by camera system 5.

In PC 10A, when App provider 9 requests App provider registration through input device 14A or the like, Web browser function unit 12 makes an App provider registration request to management server 30 (T11). In the App provider registration request, the information on the mail address and password of App provider 9, which is retained in PC 10A or input through input device 14A, is transmitted from PC 10A to management server 30.

In management server 30, when communication unit 38 receives an App provider registration request from PC 10A, App provider management unit 33 performs App provider registration, and communication unit 38 returns App provider registration completion to PC 10A (T12).

In the App provider registration, App provider management unit 33 attaches an App provider ID for identifying App provider 9 based on the App provider registration request, and retains the App provider ID, and the mail address and password of App provider 9 in table 53. In the App provider registration completion, the App provider ID is returned to PC 10A.

In PC 10A, when App provider 9 inputs the mail address and password through input device 14A or the like to request login, Web browser function unit 12A transmits the mail address and password to management server 30 to request login (T3A).

In management server 30, when the communication unit 38 receives the login request and the mail address and password from PC 10A, user management unit 31 refers to table 53 and collates the mail address and password. If the collation succeeds, that is, if there is a matching mail address and password, communication unit 38 issues a session ID and makes a notification of the login completion (T4A). The session ID is managed in association with the App provider ID.

In PC 10A, when App provider 9 requests App registration through input device 14A or the like, Web browser function unit 12 makes an App registration request to management server 30 by using the session ID (T13). In the App registration request, the App name and App description are transmitted from PC 10A to management server 30. The App name is input by, for example, input device 14 A of PC 10A, or the like.

In management server 30, when communication unit 38 receives an App registration request from PC 10A, App management unit 34 performs App registration, and communication unit 38 returns App registration completion to PC 10A (T14). In the App registration, App management unit 34 attaches an AppID based on the App registration request to generate an App server authentication key, and retains the AppID, the App name from PC 10A, an App description relating to the App identified by the AppID, the App provider ID for identifying App provider 9 providing the App identified by the AppID, and the App server authentication key, in table 54. In the App registration completion, the AppID and the App server authentication key are returned to PC 10A.

In App server 40, when App provider 9 receives various types of information through input device 14A or the like, control unit 42 sets various types of information (T15). This setting indicates that various types of information are retained by, for example, the memory of App server 40. The various types of information include information on, for example, the AppID and the App server authentication key.

Communication unit 45 becomes accessible to management server 30 by using the set AppID and App server authentication key (T16).

According to the App provider registration and App registration procedures shown in FIG. 14, camera system 5 can easily set the information on App provider 9 and information on the App. By using the App server authentication key, security of communication between App server 40 usable by App provider 9 and management server 30 can be secured.

Figure 15:
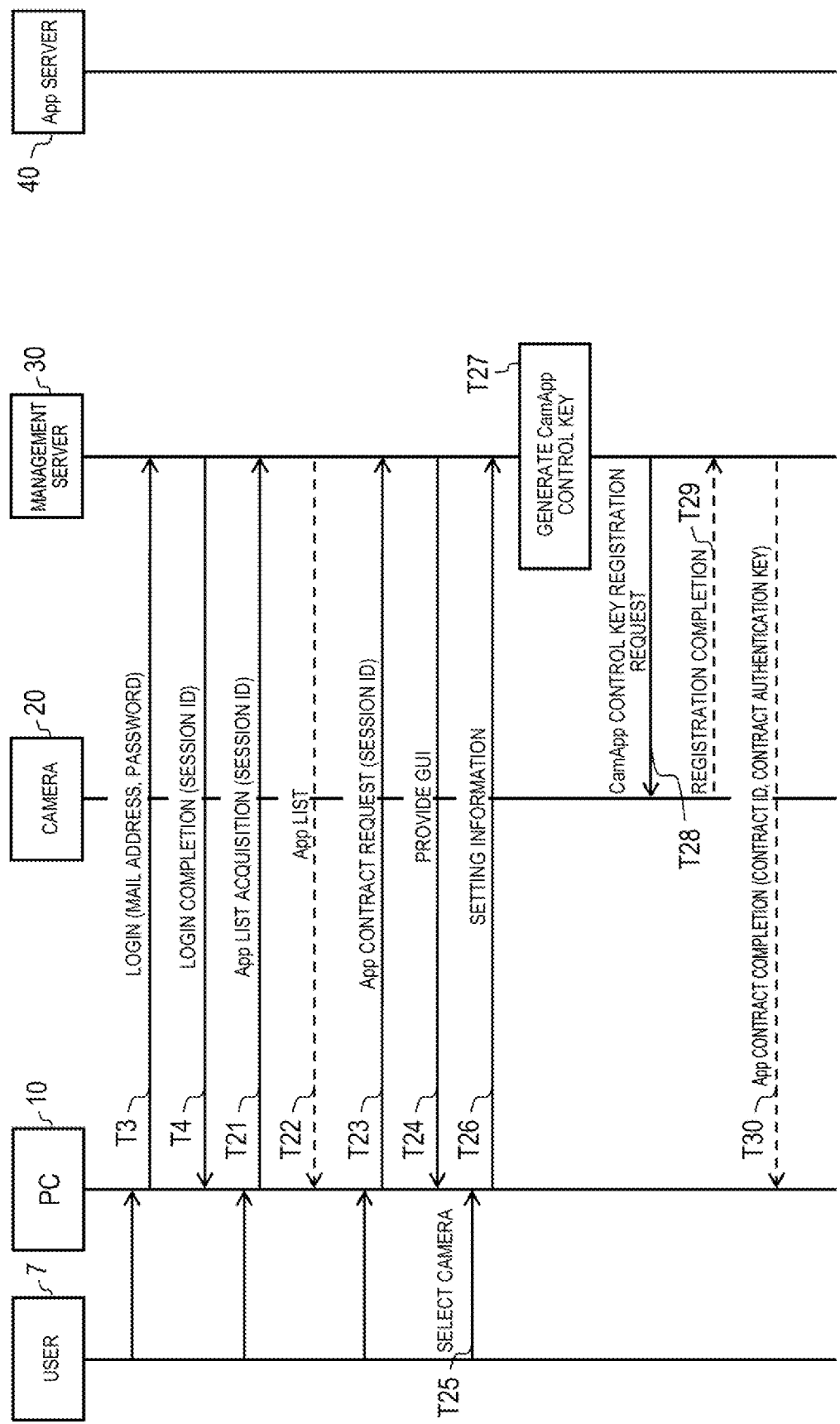
FIG. 15 is a sequence diagram showing an example of an App contract procedure by the camera system in the first exemplary embodiment.

FIG. 15 is a sequence diagram showing an example of App contract procedure by camera system 5.

First, PC 10 performs the process of T3 shown in FIG. 13. Management server 30 performs the process of T4 shown in FIG. 13.

In PC 10, when user 7 requests acquisition of the App list through input device 14 or the like, Web browser function unit 12 requests management server 30 to acquire the App list by using the session ID (T21).

In management server 30, when communication unit 38 receives a request to acquire an App list, App management unit 34 extracts App information as the App list from table 54, and communication unit 38 transmits the extracted information to PC 10 (T22). In this case. App management unit 34 extracts all or a part of each piece of App information as an App list.

In PC 10, when Web browser function unit 12 acquires the App list and user 7 selects a desired App from the App list through input device 14 or the like, Web browser function unit 12 makes an App contract request to management server 30 by using the session ID (T23). In the App contract request, an AppID identifying the selected App is sent from PC 10 to management server 30.

In management server 30, upon receiving the request of the App contract, communication unit 38 transmits the information on GUI screen 59 (see FIG. 16) to PC 10 (T24). GUI screen 59 is a setting screen for setting the camera to be used in the App to be contracted.

In PC 10, Web browser function unit 12 acquires GUI screen 59, and user 7 selects the camera to be used in the App to be contracted through input device 14 or the like (T25). Web browser function unit 12 includes the camera selection information in the setting information and transmits it to management server 30 (T26).

In management server 30, when communication unit 38 receives setting information from PC 10, control authority management unit 37 generates CamApp control authority by generating a CamApp control key (T27). Then, communication unit 38 notifies camera 20 of the registration request of the CamApp control key including the information on the CamApp control key (T28). The registration request of the CamApp control key is notified to, for example, camera 20 selected in T25.

In camera 20, communication unit 25 receives the registration request of the CamApp control key, and control authority management unit 22 sets the CamApp control authority by registering the CamApp control key. The CamApp control key is retained in, for example, control authority management unit 22.

Communication unit 25 returns the registration completion of the CamApp control key to management server 30 (T29).

Incidentally, when the CamApp control key is registered in camera 20, management server authentication unit 24 may determine whether or not the CamApp control key can be registered, that is, whether the CamApp control authority can be set, using the camera control authority control key (master key) written at the time of manufacturing camera 20.

In management server 30, when communication unit 38 receives a notification of registration completion of CamApp control authority from camera 20, contract management unit 36 performs contract registration. In the contract registration, contract management unit 36 attaches a contract ID based on the App contract request, generates a contract authentication key, and retains the contract ID, the user ID relating to the contract, the AppID relating to the contract, the contract authentication key, and the CamApp control key, in table 55. Incidentally, the contract registration may be performed before management server 30 receives the notification of registration completion from camera 20.

In a case where one CamApp control key is issued for each contract, it is necessary only to register information in table 55. In a case where a CamApp control key is issued for each contract and each camera, information is also registered in table 56. Specifically, in the contract registration, control authority management unit 37 issues a CamApp control key ID based on the App contract request and the setting information in T26, and retains the contract ID, the camera ID, and the CamApp control key in table 56.

Communication unit 25 transmits the information on the contract ID and the contract authentication key retained in table 55 to PC 10, and notifies the completion of the App contract (T30).

According to the App contract procedure shown in FIG. 15, camera 20 can register the CamApp control key for each contracted App, that is, it can set CamApp control authority. Thus, it is possible to limit the control over CamApp to be installed in camera 20 to a specific device, and suppress unauthorized change or use of CamApp.

The processes from T24 to T26 may be omitted. In this case, the CamApp control key is set for all cameras 20 possessed by user 7, with respect to the App selected in T23. Therefore, App server 40 can control CamApp for all cameras 20 possessed by user 7.

FIG. 16 is an example of GUI screen 59. GUI screen 59 is provided to PC 10 by management server 30, for example, when user 7 newly makes an App contract or when user 7 changes the setting of a contracted App. Camera 20 in which the CamApp corresponding to the App is allowed to be installed is designated on GUI screen 59.

In FIG. 16, it is exemplified that the App is a customer analysis App, and the entrance camera, the exit camera, and the drink corner camera are selected as camera 20 in which the CamApp is allowed to be installed. In this case, for example, a camera ID for identifying selected camera 20 is sent from PC 10 to management server 30.

Any camera name to be displayed on GUI screen 59 may be selected by user 7 through input device 14 or the like. For example, when the information on camera 20 is registered in management server 30, the camera name is designated.

In the case of FIG. 16, the CamApp control key is registered for the entrance camera, the exit camera, and the drink corner camera selected on GUI screen 59, and the access authority (CamApp control authority) from App server 40 is given thereto.

Figure 17:
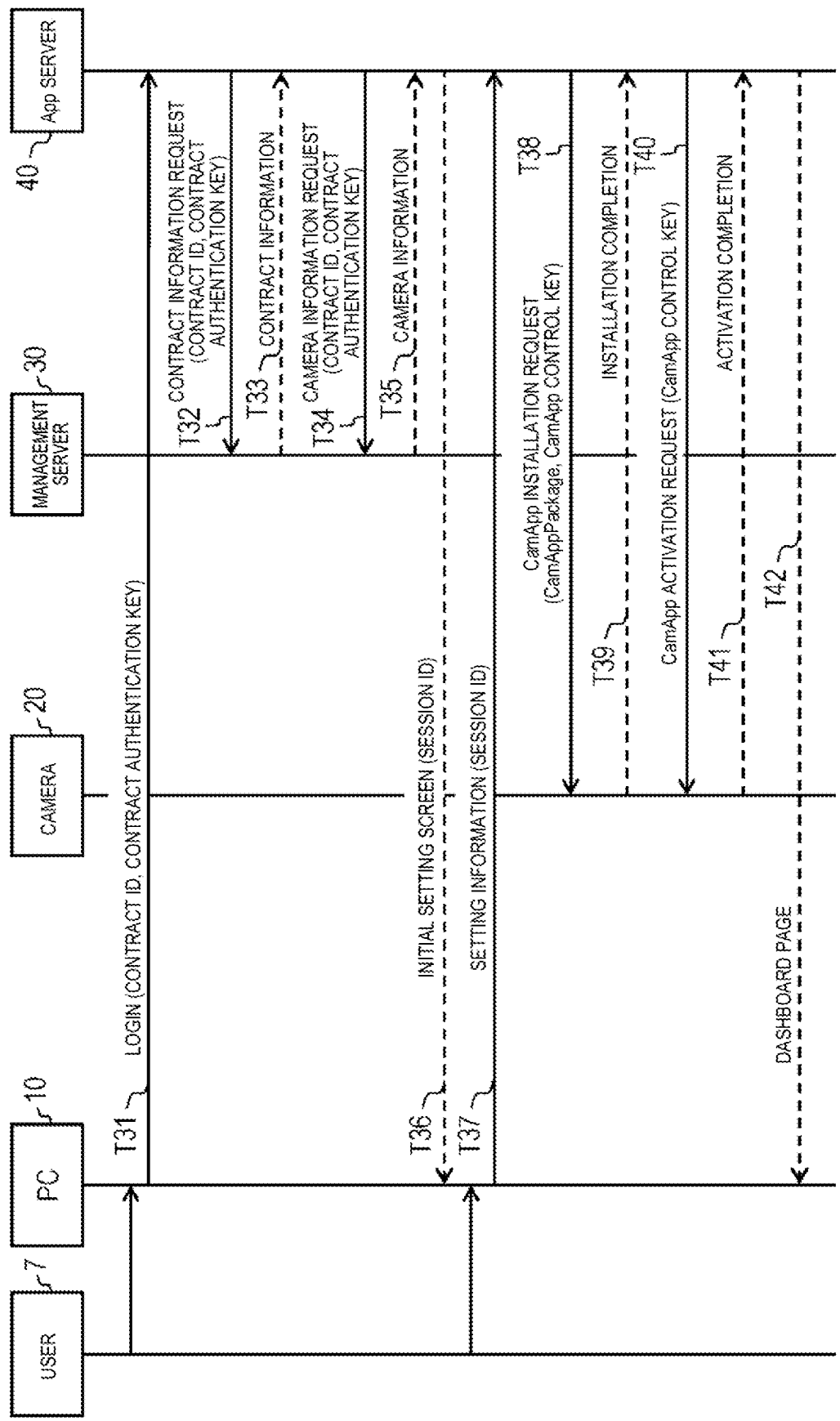
FIG. 17 is a sequence diagram showing an example of an App usage start procedure by the camera system in the first exemplary embodiment.

FIG. 17 is a sequence diagram showing an example of App usage start procedure by camera system 5.

At PC 10, if the user 7 enters a contract ID and a contract authentication key through input device 14 or the like to request a login, Web browser function unit 12 performs login by transmitting the contract ID and the contract authentication key to the App server 40 (T31).

In App server 40, when the above login is made, communication unit 45 transmits information on the contract ID and the contract authentication key acquired from PC 10 to management server 30, and requests contract information (T32). In order to authenticate App server 40, communication unit 45 may also transmit the AppID and the App server authentication key to management server 30.

In management server 30, when communication unit 38 receives a request for contract information, contract management unit 36 extracts a part or all of the contract information retained in table 55 relating to the acquired contract ID, and communication unit 38 transmits the extracted contract information to App server 40 (T33). The contract information includes the CamApp control key. In App server 40, control unit 42 retains the CamApp control key. In App server 40, the CamApp control key is managed in association with each contract ID or each contract ID and camera ID.

In a case where one CamApp control key is issued for each one contract, contract management unit 36 needs only to extract contract information from table 55. On the other hand, in a case where a CamApp control key is issued for each one contract and one camera, control authority management unit 37 extracts a part or all of the CamApp control key information from table 56. Communication unit 38 transmits the extracted CamApp control key information to App server 40. In App server 40, control unit 42 retains the CamApp control key.

In App server 40, communication unit 45 transmits the contract ID and the contract authentication key to management server 30, and requests camera information (T34).

In management server 30, when communication unit 38 receives a request for camera information, camera management unit 32 extracts a part or all of the camera information retained in table 52 relating to the acquired contract ID, and communication unit 38 transmits the extracted camera information to App server 40 (T35).

In App server 40, upon receiving the camera information from management server 30, communication unit 38 issues a session ID to PC 10, and transmits information on setting GUI 60 (see for example, FIG. 18), which is the initial setting screen (T36). This session ID is associated with the contract ID.

In PC 10, when user 7 inputs setting information through input device 14 using, for example, setting GUI 60, Web browser function unit 12 transmits the setting information to App server 40 by using the session ID (T37). The setting information includes, for example, a CamAppID for identifying CamApp and information on the placement location of camera 20 selected by PC 10.

In App server 40, upon receiving the setting information, communication unit 45 transmits the CamApp Package and the CamApp control key relating to the selected CamAppID and the placement location of camera 20 to camera 20, and requests installation of the CamApp (T38). The install request is executed for camera 20 to be installed, that is, all the cameras 20 or specific camera 20 relating to the contract. As the CamApp control key to be transmitted, the contract ID, or the contract ID and the CamApp control key associated with the contract ID are selected.

In camera 20 to be installed, when the communication unit 25 receives the install request of the CamApp, control request acceptance determination unit 23 determines whether to permit the install request from App server 40, using the CamApp control key. For example, control request acceptance determination unit 23 permits the install request in a case where the CamApp control key transmitted at T38 matches the CamApp control key registered at T28 from management server 30, and it does not permit the install request in a case of mismatch.

In a case where it is determined that the install request is permitted, CamApp management unit 21 installs the CamApp using the CamApp Package. Upon completion of the installation of the CamApp, communication unit 25 transmits the installation completion to App server 40 (T39). The installation completion notification includes the installation ID. Control of installed CamApp is performed using the installation ID.

In App server 40, communication unit 45 transmits the selected CamAppID and the CamApp control key and installation ID relating to the placement location of camera 20 to camera 20, and requests activation of the CamApp (T40). This activation request is performed for camera 20 to be activated, that is, all the cameras 20 or specific camera 20 relating to the contract.

In camera 20 to be activated, when the communication unit 25 receives the activation request of the CamApp, control request acceptance determination unit 23 determines whether to permit the activation request from App server 40, using the CamApp control key. The method of determining whether to permit the activation request is the same as the above-described method of determining whether to permit the install request.

In a case where it is determined that the activation request is permitted, CamApp management unit 21 activates the CamApp relating to the installation ID. If the activation of the CamApp is completed, communication unit 25 transmits activation completion to App server 40 (T41).

In App server 40, when communication unit 25 receives the completion of activation from camera 20, it transmits a dashboard page to PC 10 (T42).

According to the App usage start procedure shown in FIG. 17, PC 10 can designate which CamApp is to be stalled in which camera. User 7 is, for example, the owner of store 3 (for example, a shop or a restaurant), and sufficiently knows which camera image he or she wants to use for what purpose. Since user 7 designates camera 20 and CamApp to be installed by using PC 10, it is possible to install the CamApp reflecting user 7's intention.

App server 40 can securely acquire contract information and camera information from management server 30 by using the contract authentication key. In addition, camera 20 can securely control the CamApp by authenticating App server 40 using the CamApp control key relating to the contract, and it is possible to suppress, for example, unauthorized use and modification of CamApp.

FIG. 18 is a schematic diagram showing an example of setting GUI 60 displayed on display 15 of PC 10.

Setting GUI 60 is displayed on the screen, for example, by display 15 of PC 10, and is operated by the user through input device 14 or the like of PC 10. Input device 14 receives, for example, an input operation for selecting specific camera 20 from a plurality of cameras 20 placed in store 3. For example, it is possible to set CamApp to be installed, for camera 20 placed at various places of store 3.

Examples of the CamApp include CamApp for camera 20 placed at the entrance of store 3 (it is simply described as "entrance" in FIG. 18), CamApp for camera 20 placed at the exit of store 3 (it is simply described as "exit" in FIG. 18), and CamApps for cameras 20 placed at other places n store 3 (it is simply described as "others" in FIG. 18).

In FIG. 18, camera names: "entrance camera", "exit camera", "box lunch corner camera", and "drink corner camera" are displayed as plural cameras 20 placed in store 3. The camera names correspond to the installation places of camera 20, respectively.

The CamApp to be installed in each of "entrance camera", "exit camera", "box lunch corner camera", and "drink corner camera" is selected using pull-down menu 61 by input device 14, for example. The selected information (for example, a CamAppID for identifying the selected CamApp) is transmitted as setting information to, for example, App server 40.

Further, input device 14 of PC 10 uses setting GUI 60 to select the start time and the end time of the desired time zone for statistics by App server 40, using pull-down menu 64. The selected information is transmitted to, for example, App server 40, and is used for deriving statistical information by App server 40.

By using setting GUI 60, user 7 can easily input which camera 20 which CamApp is to be installed in, using input device 14. Further, user 7 can easily input a desired time zone for statistics and other information relating to statistics.

Here, it is exemplified that user 7 selects CamApp to be installed through input device 14 or the like, but user 7 may not select CamApp, and CamApp may be installed in the installation destination camera 20. Thus, it is possible for user 7 to simply use the App without being conscious of each CamApp.

Hereinafter, two other examples of the designation method of CamApp to be installed are shown. In another example, it is assumed that the combination of the placement location of camera 20 and the CamApp to be installed in camera 20 is determined in advance and information on the combination is retained in advance in CamApp management unit 41 of App server 40. In addition, the combination of the placement location of camera 20 and CamApp to be installed may be different for each App.

For example, in camera 20, communication unit 25 may transmit the image captured by image capture unit 27 to App server 40. In App server 40, CamApp management unit 41 may determine the placement position (for example, an entrance of store 3, or an exit of store 3) of camera 20 by performing a predetermined image process. CamApp management unit 41 may designate CamApp corresponding to the determined placement position as a CamApp to be installed.

For example, at the time of App contract (for example, at the time of initial setting of camera 20), a remotely located operator (not shown) may visually recognize the image of each camera 20 to determine the placement position, and set information on the placement position of each camera 20 as a determination result in App server 40 through an input device or the like. In App server 40, CamApp management unit 41 may designate CamApp corresponding to the determined placement position as CamApp to be installed.

By installing CamApp without the CamApp to be installed being selected by user 7, the user of the App may not recognize that the CamApp for an entrance and the CamApp for an exit are installed in cameras 20 placed at the entrance and the exit of store 3. Further, the user of the App may not recognize what type of process the CamApp for an entrance and the CamApp for an exit perform.

Figure 19:
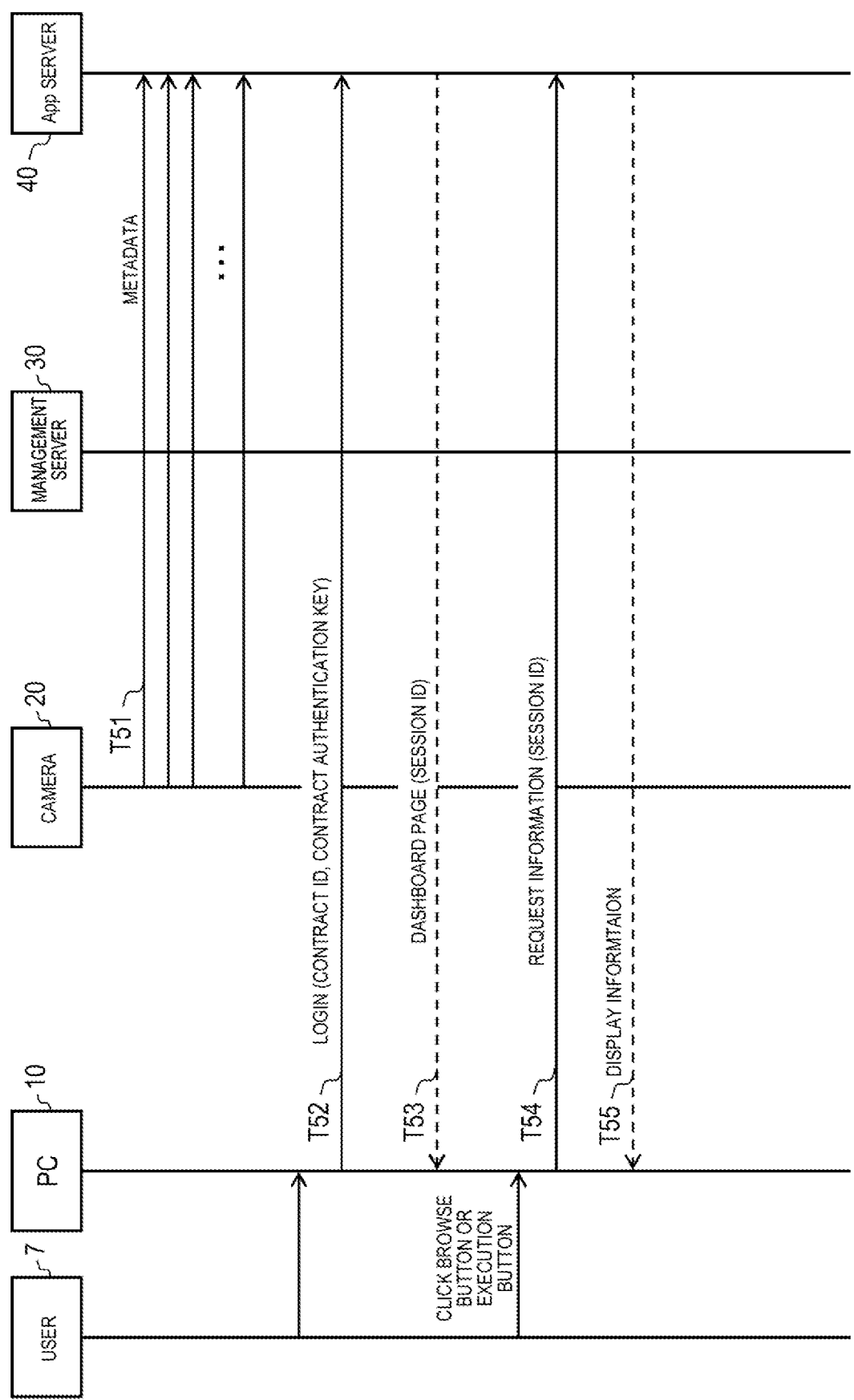
FIG. 19 is a sequence diagram showing an example of an App usage procedure by the camera system in the first exemplary embodiment.

FIG. 19 is a sequence diagram showing an example of an App usage procedure by camera system 5.

In camera 20, image capture unit 27 captures an image, application execution unit 28 generates metadata from the captured image, and communication unit 25 transmits the metadata to App server 40 (T51). The metadata may be sequentially transmitted from each camera 20.

For example, camera 20 calculates the feature amount (an example of metadata) of the customer's face by executing the CamApp for the entrance of store 3, and transmits the feature amount to App server 40 corresponding to CamApp for internal use in store 3 and CamApp for an exit. One App server 40 is provided for each App. In a case where matching of the feature amount is performed within CamApp, the feature amount calculated by CamApp for an entrance is sent to the CamApp for internal use and the CamApp for an exit. In a case where matching of the feature amount is performed in App server 40, the feature amount calculated by the CamApp for an entrance is transmitted to App server 40.

For example, camera 20 searches for a face matching the feature amount (an example of metadata) calculated by CamApp for an entrance of store 3, by executing the CamApp for internal use in store 3. When a matching face is found, camera 20 transmits information (an example of metadata) including a fact that a matching face is present, to App server 40 corresponding to the CamApp for internal use in store 3. The calculated feature amount may be transmitted to App server 40 as metadata, and App server 40 may perform a face matching process.

For example, camera 20 searches for a face matching the feature amount calculated by the CamApp for an entrance of store 3, by executing the CamApp for an exit of store 3. In a case where a matching face is found, camera 20 transmits information including a tact that a matching face is present, to App server 40. The calculated feature amount may be transmitted to App server 40 as metadata, and App server 40 may perform a face matching process.

In App server 40, communication unit 45 receives the metadata, and application execution unit 28 determines contract and metadata, based on camera 20 which is a transmission source of the acquired captured image, and calculates statistical information or the like for each contract.

In PC 10, if user 7 enters a contract ID and a contract authentication key through input device 14 or the like to request a login, Web browser function unit 12 performs login by transmitting the contract ID and the contract authentication key to App server 40 (T52).

In App server 40, when communication unit 45 receives a login request, CamApp management unit 41 issues a session ID according to the login, and communication unit 45 transmits the information on the dashboard page to PC 10 (T53).

In PC 10, when Web browser function unit 12 receives the information on the dashboard page, it displays a dashboard page including the information received, on display 15.

In PC 10, when user 7 selects one of the buttons on the dashboard page by using the session ID through input device 14 or the like, Web browser function unit 12 makes a request for necessary information on the selected execution button, to App server 40 (T54).

In App server 40, when communication unit 45 receives the request for necessary information on the selected button, statistical information management unit 46 derives various types of statistical information based on the acquired information. Communication unit 45 transmits the display information to be displayed on the dashboard page to PC 10 (T55). App server 40 manages the session ID and the contract ID in association with each other, and determines the access source which is user 7 based on a contract ID, depending on the session ID.

In PC 10, Web browser function unit 12 receives the display information from App server 40, and display 15 displays the dashboard page according to the display information.

Thus, for example, in a case where a predetermined button is selected, a result relating to the selected statistical process is displayed on display 15.

According to the App usage procedure shown in FIG. 19, user 7 can check the image captured by desired camera 20 and the statistical information on the desired App by using PC 10, thereby improving the convenience. In addition, user 7 can simply perform input using the dashboard page when trying to check the image captured by desired camera 20 and the statistical information on the desired App.

Figure 20:
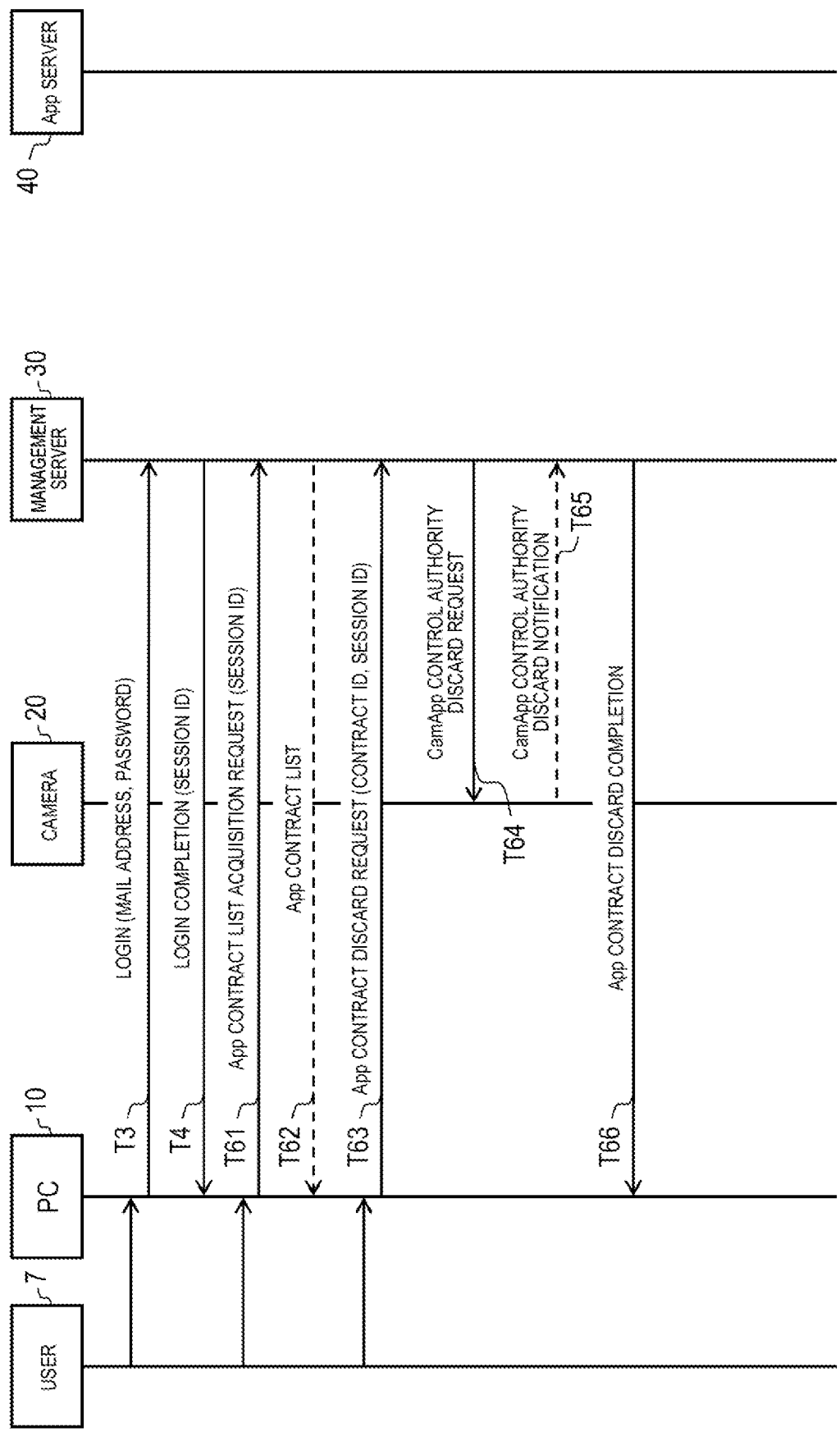
FIG. 20 is a sequence diagram showing an example of an App contract discard procedure by the camera system in the first exemplary embodiment.

FIG. 20 is a sequence diagram showing an example of App contract discard procedure by camera system 5.

First, PC 10 performs the process of T3 shown in FIG. 13. Management server 30 performs the process of T4 shown in FIG. 13.

In PC 10, when user 7 requests acquisition of the App contract list through input device 14 or the like, Web browser function unit 12 makes a request for acquisition of the App contract list to management server 30, by using the session ID (T61).

In management server 30, when communication unit 38 receives a request to acquire the App contract list, contract management unit 36 extracts contract information as an App contract list from table 55, and communication unit 38 transmits the extracted information to PC 10 (T62). In this case, contract management unit 36 extracts all or a part of each piece of contract information as an App contract list.

In PC 10, Web browser function unit 12 acquires the App contract list, and user 7 refers to the App contract list displayed on display 15, and instructs the discard of a specific App contract by using input device 14 or the like. Then. Web browser function unit 12 transmits a contract ID of the contract for which contract discard is instructed, to management server 30 using the session ID, and requests the App contract discard (T63).

In management server 30, when communication unit 38 receives a request for App contract discard from PC 10, control authority management unit 37 makes a request for discard of the CamApp control key relating to the acquired contract ID, to camera 20 (T64).

In camera 20, when communication unit 25 receives the discard request of the CamApp control key, control authority management unit 22 discards the retained CamApp control key. Incidentally, the CamApp may be uninstalled by control authority management unit 22 discarding the CamApp control key and CamApp management unit 21 searching the CamApp relating to the CamApp control key.

In camera 20, when the CamApp control key is discarded, communication unit 25 notifies management server 30 and PC 10 of the discard completion of the CamApp control key (T65 and T66).

According to the App contract discard procedure shown in FIG. 20, camera 20 can easily discard the App contract and discard the CamApp control key relating to the discarded App contract. Accordingly, even in a case of acquiring the CamApp control key from App server 40, camera 20 cannot permit control over CamApp. Therefore, after the end of the App contract, it is possible to prevent camera 20 from being controlled using CamApp.

According to camera system 5 of the present exemplary embodiment, management server 30 can control the access authority (control authority) to camera 20, for App server 40. That is, management server 30 can easily provide CamApp control authority for specific camera 20 to specific App server 40, using the CamApp control key. Therefore, camera system 5 can realize the mechanism in which App server 40 controls camera 20 using CamApp safely and simply for user 7.

Therefore, for example, even in a case where a new CamApp is installed from the remote place by the request of user 7 after camera 20 is placed, camera system 5 can improve the security concerning the installation and add functions by the CamApp.

Further, even in a case where App provider 9 as a third party different from user 7 and a monitoring company by camera 20 develops a new CamApp and provides the CamApp using App server 40, camera system 5 can limit access to CamApp to specific App server 40. Therefore, even in a case where the degree of freedom in using App server 40 is increased, it is possible to secure security when access to the CamApp or camera 20 is made from App server 40.

Further, camera 20 extracts metadata such as age and gender from the captured image by the CamApp, and App server 40 can obtain various types of statistical information using the metadata. User 7 can make use of the obtained information for monitoring and marketing. In addition, App server 40 can also derive, for example, a correlation between a customer stay time in store 3 and sales as statistical information, estimate customer psychology, and utilize it for store management.

Further, since an appropriate CamApp is installed for each camera 20, App server 40 can collect and analyze various attributes (for example, face feature, age, gender, dress, time), and can use the analysis result, for example, for the operation of store 3.

By using the CamApp control key generated by management server 30, camera 20 can check whether or not an install request and an activation request is from legitimate app server 40, and can improve the security when installation and activation of the CamApp.

Since management server authentication unit 24 authenticates management server 30, camera 20 can ensure that requests and instructions from management server 30 are legitimate.

Since the CamApp control authority is deleted from camera 20 in a case where the App contract ends, it becomes impossible to access camera 20 through the CamApp from App server 40, so that illegal access to camera 20 from App server 40 after the contract ends 20 can be prevented.

By using CamApp control authority, it is not necessary to change the master key of camera 20 every time the contract ends, which can reduce complication in key management. Further, since App server 40 acquires the CamApp control key without acquiring the master key, leakage of the master key of camera 20 can be reduced.

By using setting GUI 60, user 7 can easily perform the operation of selecting the placement location of camera 20, and operability can be improved.

Second Exemplary Embodiment

The first exemplary embodiment illustrates that App server 40 (CamApp management unit 41 of App server 40) retains a CamApp Package including CamApp. The second exemplary embodiment illustrates that management server 30A retains a CamApp Package including CamApp.

In camera system 5A of the second exemplary embodiment, the same reference numerals are used for the same components as those of camera system 5 of the first exemplary embodiment, and the explanation thereof will be omitted or simplified. The configuration of each apparatus in the present exemplary embodiment is the same as that in the first exemplary embodiment.

Figure 21:
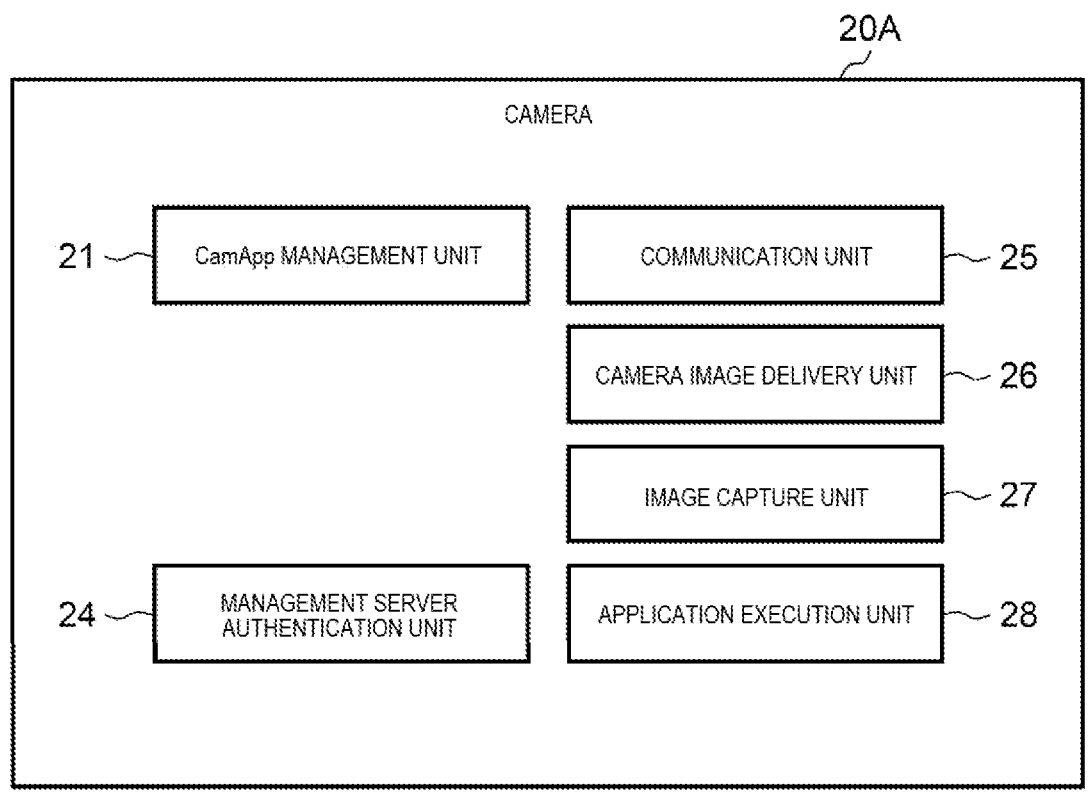
FIG. 21 is a block diagram showing a configuration example of a camera in a second exemplary embodiment.

FIG. 21 is a block diagram illustrating a configuration example of camera 20A.

Camera 20A includes, for example, a CPU or a DSP, and a ROM or RAM. The CPU or the DSP executes various programs (for example, an OS, a middleware program, and an application program) retained in the ROM or the RAM to realize various functions of camera 20A. Camera 20A download, install, and execute, for example, various applications.

Camera 20A includes, for example, a communication interface for communicating with another communication devices, an input and output interface for inputting and outputting data, and a user interface.

Camera 20A includes CamApp management unit 21, management server authentication unit 24, communication unit 25, camera image delivery unit 26, image capture unit 27, and application execution unit 28. Therefore, camera 20A does not include control authority management unit 22 and control request acceptance determination unit 23. In other words, the determination of the presence or absence of the control authority as to whether or not camera 20A can be controlled is not performed by camera 20A.

Figure 22:
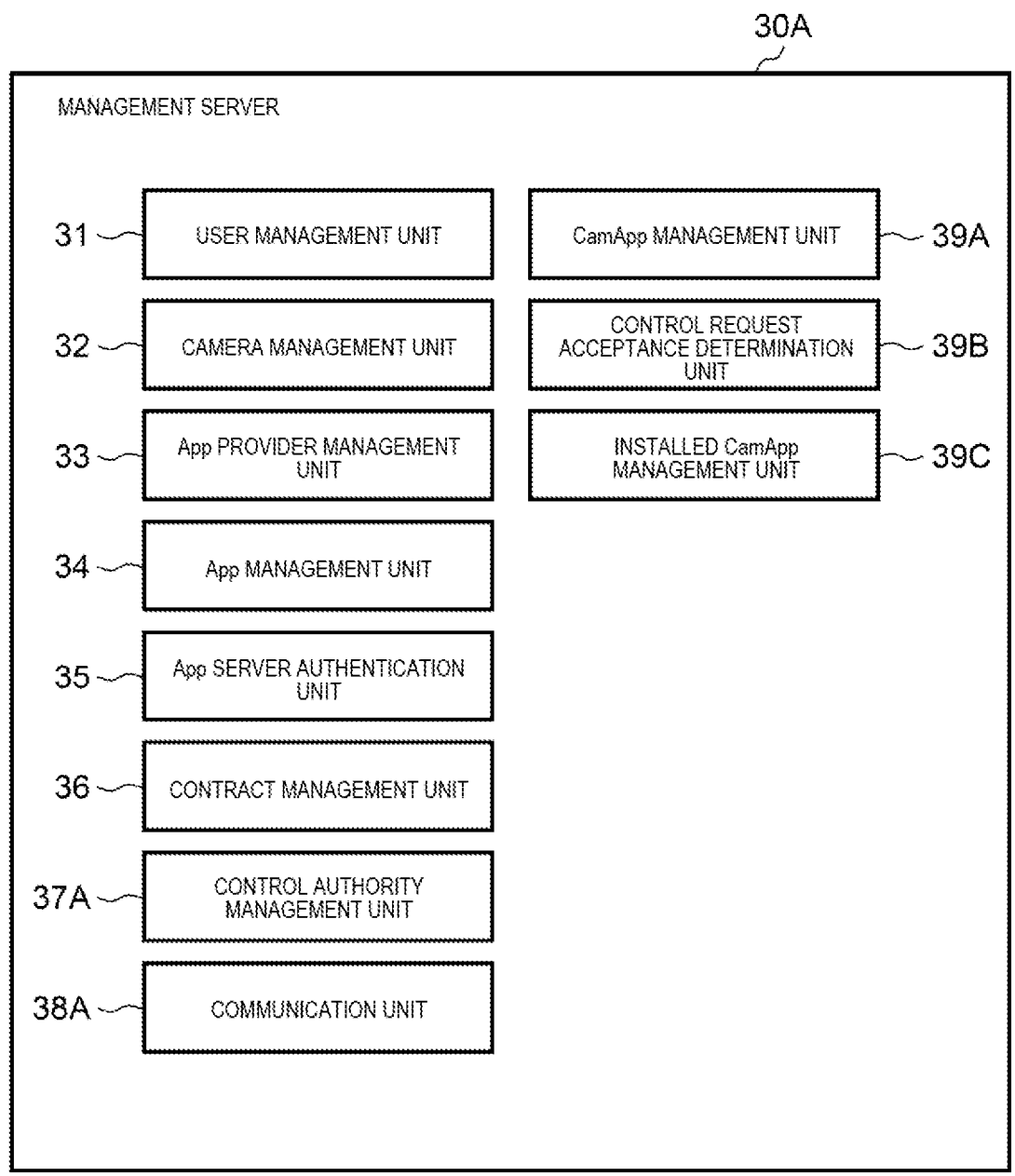
FIG. 22 is a block diagram showing a configuration example of a management server in a second exemplary embodiment.

FIG. 22 is a block diagram illustrating a configuration example of management server 30A. Management server 30A accumulates CamApp.

Management server 30A includes, for example, a CPU or a DSP, and a ROM or RAM. The CPU or the DSP executes various programs (for example, an OS, a middleware program, and an application program) retained in the ROM or the RAM to realize various functions of management server 30A.

Further, management server 30A includes, for example, a communication interface for communicating with another communication devices, an input and output interface for inputting and outputting data, and a user interface.

Management server 30A includes user management unit 31, camera management unit 32, App provider management unit 33, App management unit 34, App server authentication unit 35, contract management unit 36, control authority management unit 37A, communication unit 38A, CamApp management unit 39A, control request acceptance determination unit 39B, and installed CamApp management unit 39C.

Control authority management unit 37A manages an authority App server 40A has for controlling which CamApp for which camera 20A, that is, CamApp control authority. In the first exemplary embodiment, the CamApp control authority is determined using the control key, but in the second exemplary embodiment, the CamApp control authority is determined using the contract information of the App corresponding to the CamApp. The contract information on the App is information on the contract registered in table 55A, and includes at least the contract ID.

CamApp management unit 39A accumulates and manages CamApp information, and a CamApp Package (camera application package) to be installed in camera 20A. CamApp management unit 39A accumulates for example, CamApp information to be described later, in table 62.

Further, the CamApp information and the CamApp Package are registered by App provider 9 through input device 14A or the like. The GUI for the registration is transmitted to, for example, PC 10A operated by App provider 9 by a Web server.

Control request acceptance determination unit 39B receives the CamApp control request from App server 40A, refers to the CamApp control authority, and determines whether or not the CamApp control request is a request from App server 40A having legitimate authority. That is, it is determined whether or not the CamApp control request to camera 20A is within the range of the CamApp control authority permitted for App server 40A. In the case of a CamApp control request from legitimate App server 40A, CamApp management unit 39A instructs camera 20A to perform a process according to the CamApp control request.

Control request acceptance determination unit 39B determines whether or not App server 40A which has made the CamApp control request has the control authority for the CamApp of specific camera 20A, for example, based on the contract information (for example, a contract ID) on a contract. Control request acceptance determination unit 39B refers to, for example, table 55A in which contract information is registered, and in a case where the contract ID relating to the control request is registered in table 55A, it determines that there is a control authority, and allows control of the CamApp. On the other hand, control request acceptance determination unit 39B refers to, for example, table 55A in which contract information is registered, and in a case where the contract ID relating to the control request is not registered in table 55A, it determines that there is no control authority, and prohibits control of the CamApp.

Communication unit 38A communicates various types of information and data. Communication unit 38A transmits, for example, the CamApp Package and the CamApp control request (for example, activation, termination, installation, uninstallation, and update requests of CamApp) to camera 20A.

Figure 23:
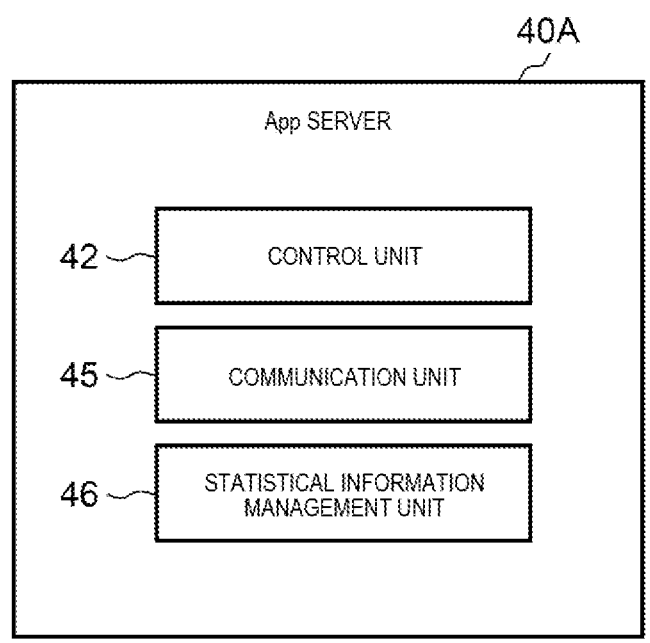
FIG. 23 is a block diagram showing a configuration example of an App server in the second exemplary embodiment.

FIG. 23 is a block diagram illustrating a configuration example of App server 40A. App server 40A accumulates ServerApp.

App server 40A includes, for example, a CPU or a DSP, and a ROM or RAM. The CPU or the DSP executes various programs (for example, an OS, a middleware program, and an application program) retained in the ROM or the RAM to realize various functions of App server 40A.

In addition, App server 40A includes, for example, a communication interface for communicating with another communication devices, an input and output interface for inputting and outputting data, and a user interface.

App server 40A includes control unit 42, communication unit 45, and statistical information management unit 46. Communication unit 45 communicates various types of information and data. Communication unit 45 transmits, for example, the CamApp control request (for example, activation, termination, installation, uninstallation, and update requests of CamApp) to management server 30A.

FIG. 24 is a schematic diagram showing an example of registered contents of table 62 in which CamApp information managed by management server 30A in the second exemplary embodiment is registered.

Table 62 is managed by CamApp management unit 39A in management server 30A. In table 62, for example, the CamAppID, the CamApp name, the AppID, and the package file path (PackageFilepath) are registered as the CamApp information.

CamAppID is an example of identification information of CamApp. CamApp name is the name of CamApp. AppID is an example of the identification information of the App corresponding to CamApp. Package file path is a path for accessing the retain destination of the file of CamApp Package.

For example, CamAppID: "2201", CamApp name: "PeapleCountCamApp". AppID: "2101", package file path: "/packageFile/2201" are registered.

FIG. 25 is a schematic diagram showing an example of registered contents of table 63 in which installed CamApp information managed by management server 30A is registered.

Table 63 is managed by installed CamApp management unit 39C in management server 30A. In table 63, for example, the InstalledCamAppID, the contract ID, the CamAppID, the camera ID, and installation ID are registered as installation information.

The InstalledCamAppID is an example of management information for managing CamApp installed in camera 20A. The contract ID is an example of the identification information of the contract relating to the installation of CamApp. The CamAppID is an example of the identification information of the CamApp which is installed in camera 20A. The camera ID is an example of the identification information of camera 20A where CamApp is installed. The installation ID is an example of identification information for identifying the installation of the CamApp, and is acquired from camera 20A.

For example, InstalledCamAppID: "3201", contract ID: "3001", CamAppID: "2201", camera ID: "1101", and installation ID: "0001" are registered.

FIG. 26 is a schematic diagram showing an example of registered contents of table 55A in which contract information managed by management server 30A is registered.

If table 55A is compared with table 55 of the first exemplary embodiment, table 55A does not retain the information of CamApp control key. Things other than CamApp control key are the same as in table 55.

In a case where table 55A is used, for example, one CamApp control authority is present for each contract. In the present exemplary embodiment, since the contract information is registered in table 55A, the CamApp control authority is generated. Therefore, it can be said that control request acceptance determination unit 39B determines the presence or absence of the CamApp control authority, based on whether or not user 7 of camera 20A has an App contract.

Further, in a case where table 55A is used, CamApp control authority may be generated for each contract and camera. In this case, for each contract ID and camera ID retained by camera 20A and App server 40A, control authority management unit 37A generates CamApp control authority. In this case, the information on the CamApp control authority is retained in table 56A shown in FIG. 27 to be described later.

FIG. 27 is a schematic diagram showing an example of registered contents of table 56A in which the information on the CamApp control authority managed by management server 30A is registered. Table 56A is retained in, for example, control authority management unit 37A.

Comparing table 56A with table 56 of the first exemplary embodiment, table 56A retains the information on the CamApp control authority ID instead of the CamApp control key ID, and does not retain the information on the CamApp control key. Things other than the CamApp control authority ID (CamApp control key ID) and the CamApp control key are the same as in table 56.

By using table 55A and table 56A, one CamApp control authority managed by control authority management unit 37A is determined for each one contract and one camera.

Further, user 7 may designate camera 20A used for each App through input device 14 or the like. Thus, user 7 can permit access to specific camera 20A among the respective cameras 20A possessed by user 7.

In the example of table 56A, with respect to the App (App server 40A) relating to the contract ID: 3001, control over a CamApp for three cameras 20A in total identified by the camera IDs: 1101, 1102, and 1103 is permitted. With respect to the App (App server 40A) relating to the contract ID: 3002, control over CamApp for a total of one camera 20A identified by the camera ID: 1101 is permitted.

Security can be further improved by using table 56A.

Incidentally, similar to the first exemplary embodiment, management server 30A manages table 51 in which user information is registered, table 52 in which camera information is registered, table 53 in which App provider information is registered, and table 54 in which App information is registered.

Next, an operation example of camera system 5A will be described.

Figure 28:
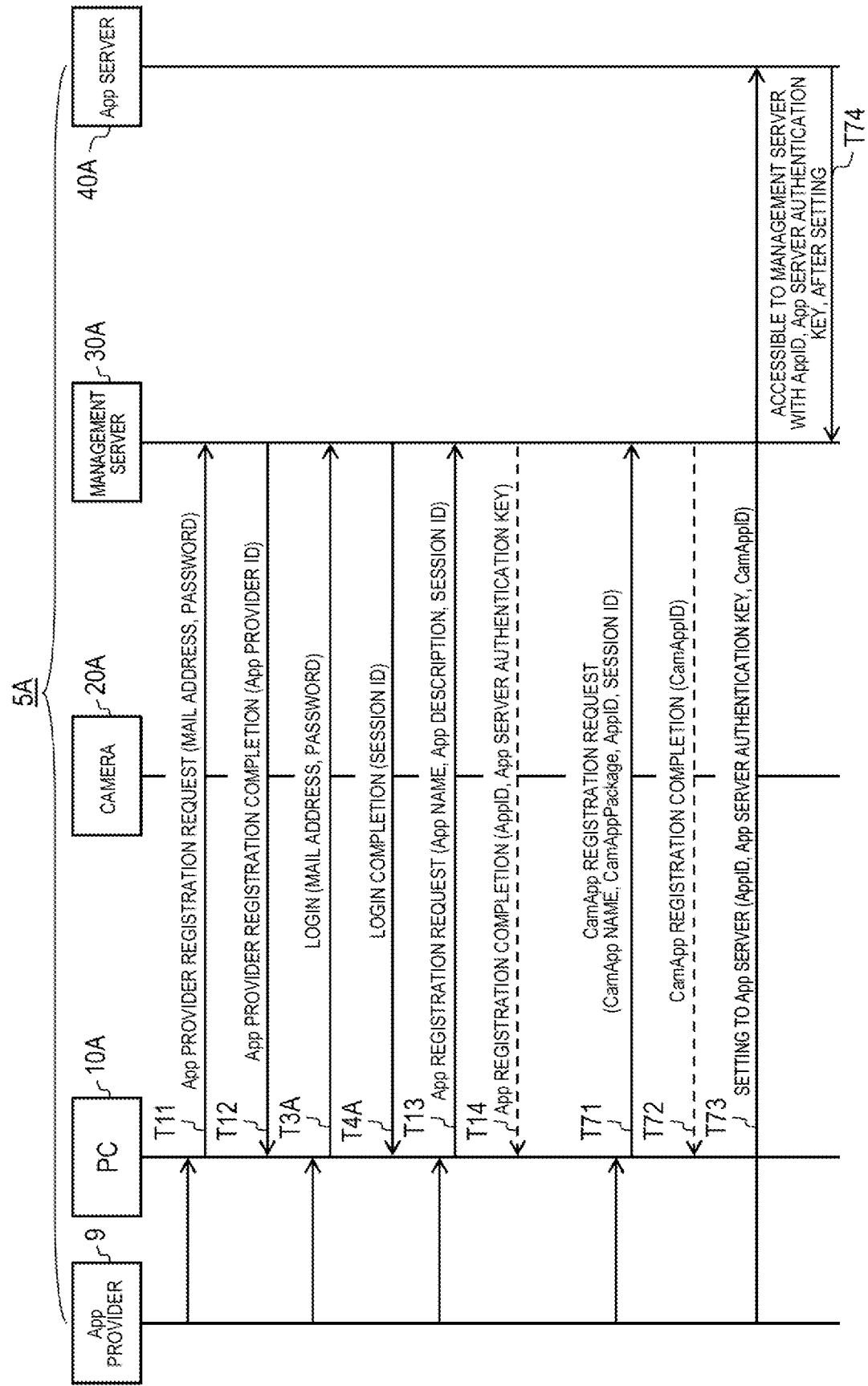
FIG. 28 is a sequence diagram showing an example of an App registration procedure by the camera system in the second exemplary embodiment.

FIG. 28 is a sequence diagram showing an example of an App provider registration and App registration procedures by camera system 5A.

First, camera system 5A performs the processes of T11, T12, T3A, T4A, T13, and T14 shown in FIG. 14.

After the process of T14, in PC 10A, when App provider 9 requests CamApp registration through input device 14A or the like, Web browser function unit 12A makes a request for CamApp registration to management server 30A, by using the session ID (T71).

In the CamApp registration request, the CamApp name, the CamApp Package, and the AppID which is retained by PC 10A for App provider or input through input device 14A is transmitted from PC 10A to management server 30A.

In management server 30A, when communication unit 38A receives the CamApp registration request, CamApp management unit 39A performs CamApp registration, and communication unit 38A transmits completion of CamApp registration to PC 10A (T72). In the CamApp registration, CamApp management unit 39A attaches the CamAppID based on the CamApp registration request, and retains the CamAppID, the CamApp name from PC 10A, the AppID corresponding to the CamApp, and a CamApp Package or its file path in table 62. In the CamApp registration completion, the CamAppID is returned to PC 10A.

Subsequently, when PC 10A receives various types of information through input device 14A, or the like, CamApp management unit 41 sets various types of information (T73). The setting information includes information on, for example, the AppID, the App server authentication key, and the CamAppID. For example, various types of information may be set through a Web browser. Further, various types of information may be set by directly logging in to a computer on which App server 40A operates and editing the file.

When the setting information is set, App server 40A can access management server 30A using the AppID and the App server authentication key (T74). The control of the CamApp registered in management server 30A is performed by making a control request from App server 40A to management server 30A using the issued CamAppID. In a case where App server 40A makes the CamApp control request, management server 30A is accessed using the CamAppID.

According to the App registration procedure shown in FIG. 28, CamApp generated by App provider 9 can be easily registered in management server 30A. Since management server 30A accumulates and manage CamApp by management server 30A, it is possible to improve the security at the time of storing the CamApp.

Figure 29:
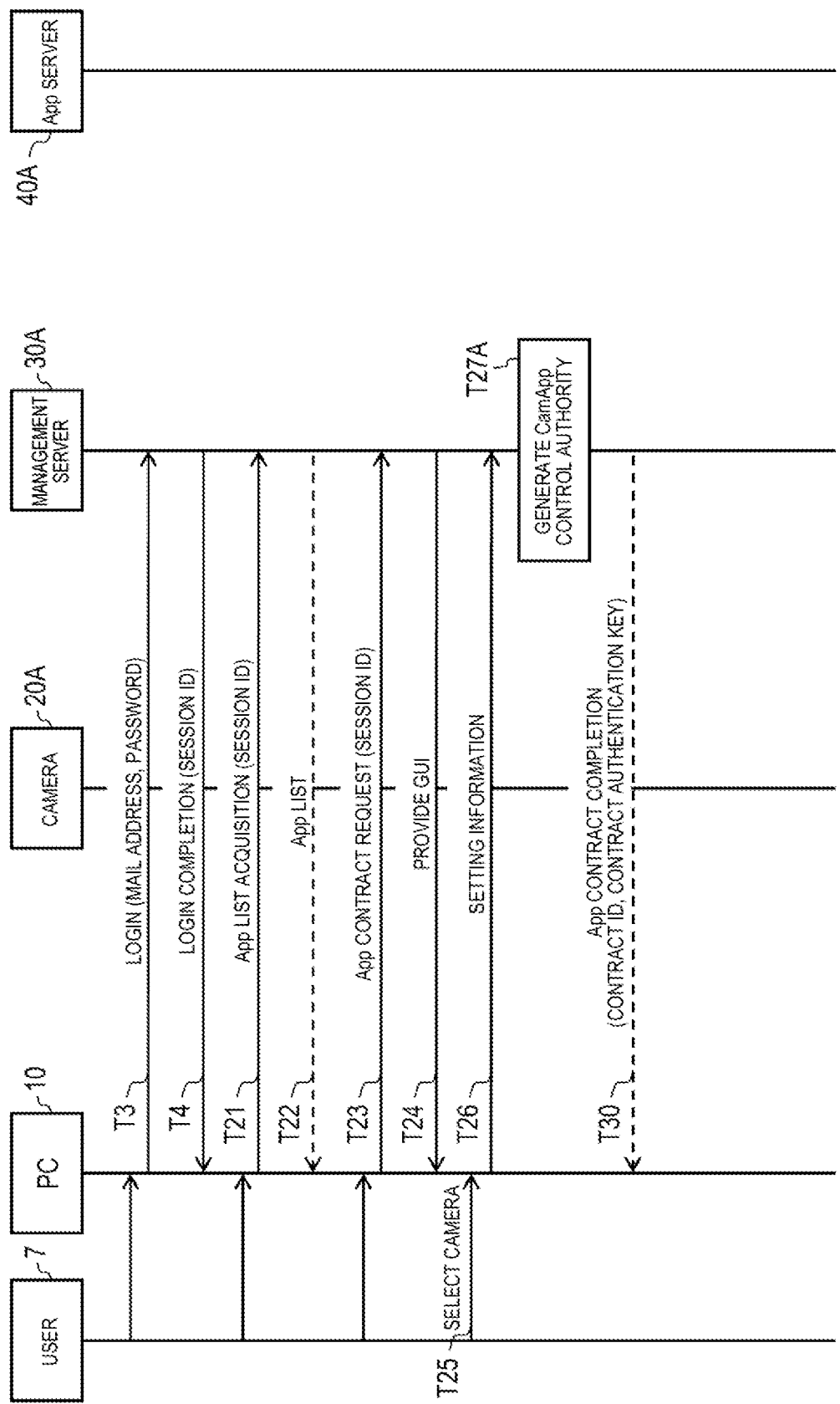
FIG. 29 is a sequence diagram showing an example of an App contract procedure by the camera system in the second exemplary embodiment.

FIG. 29 is a sequence diagram showing an example of an App contract procedure by camera system 5A.

First, camera system 5A performs the processes of T3. T4, and T21 to T26.

After the process of T26, in management server 30A, when communication unit 38A receives the setting information from PC 10, control authority management unit 37A generates CamApp control authority (T27A). The CamApp control authority is generated based on the contract registration by contract management unit 36 and managed by control authority management unit 37A. If contract management unit 36 registers a contract, the contract information of App is registered in table 55A (see FIG. 26). The contract information includes a contract ID, a user ID, an AppID, and a contract authentication key. Since contract management unit 36 registers a contract in table 55A, control authority management unit 37A generates a CamApp control authority.

In a case where one CamApp control authority is generated for each contract, it is necessary only to register information in table 55A. However, in a case where a CamApp control authority is generated for each contract and each camera, information is also registered in table 56A. Specifically, in the contract registration, control authority management unit 37A issues a CamApp control authority ID based on the App contract request and the setting information, and retains the contract ID and the camera ID in table 56A.

After the process of T27A, management server 30A performs the process of T30.

In this way, in the present exemplary embodiment, the CamApp control key is not generated and management server 30A manages CamApp control authority, based on the contract information (for example, contract ID).

Figure 30:
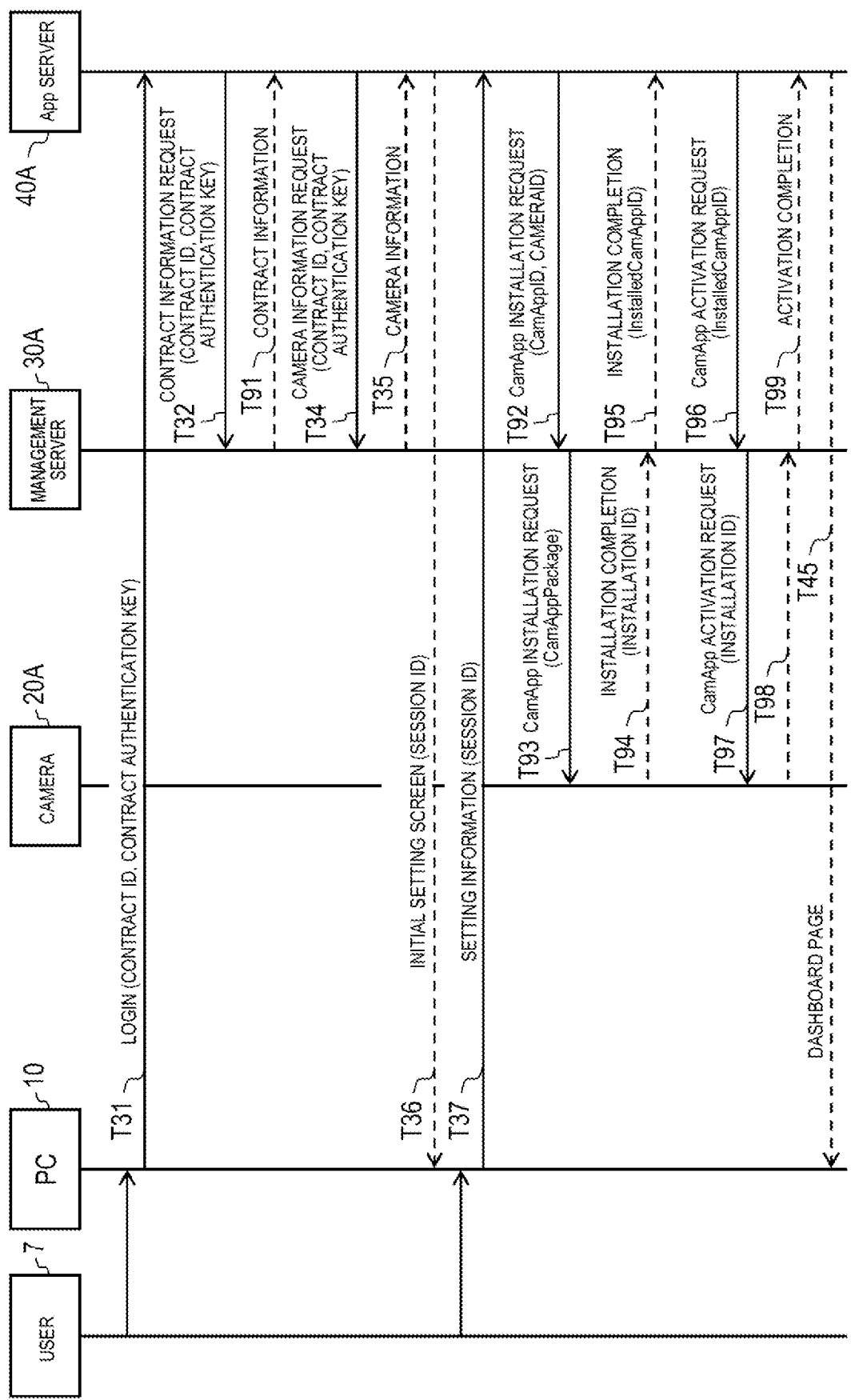
FIG. 30 is a sequence diagram showing an example of an App usage start procedure by the camera system in the second exemplary embodiment.

FIG. 30 is a sequence diagram showing an example of App usage start procedure by camera system 5A.

First, camera system 5A performs the processes of T31 and T32.

After the process of T32, in management server 30A, when communication unit 38A receives a request for contract information, contract management unit 36 extracts a part or all of the contract information retained in table 55A relating to the acquired contract ID, and communication unit 38A transmits the extracted contract information to App server 40A (T91).

Subsequently, camera system 5A executes the processes of T34 to T37.

Communication unit 45 transmits the CamAppID and the camera ID designated by the setting information of T37 to management server 30A, and requests installation of CamApp (T92). The install request is executed for camera 20A to be installed, that is, all the cameras 20A or specific camera 20A relating to the contract. Therefore, the camera ID to be transmitted is the camera ID of camera 20A to be installed.

In management server 30A, when communication unit 38A receives the install request of CamApp from App server 40A, control request acceptance determination unit 39B determines whether or not App server 40A has the CamApp control authority. As will be described in detail later, control request acceptance determination unit 39B determines whether or not the contract ID associated with the AppID is retained in table 55A. If there is a contract ID corresponding to table 55A, it is determined that it has CamApp control authority; and if there is no contract ID corresponding to table 55A, it is determined that it does not have CamApp control authority.

In a case where one CamApp control authority is generated for each contract, control request acceptance determination unit 39B needs only to determine whether or not the contract ID acquired from App server 40A is retained in table 55A. On the other hand, in a case where the CamApp control authority is generated for one contract and one camera, control request acceptance determination unit 39B further determines whether or not the contract ID and the camera ID acquired from App server 40A is retained in table 56A in association with one CamApp control authority ID. In this case, if there is the corresponding CamApp control authority ID, it is determined as having CamApp control authority; and if there is no corresponding CamApp control authority ID, it is determined as not having CamApp control authority.

The AppID and the App server authentication key are added to the request from App server 40 to management server 30. App server 40 is present for each App. The AppID is used by management server 30 to identify an access from App server 40 linked to which AppID. The App server authentication key is used by management server 30 to authenticate App server 40. This also applies to the first exemplary embodiment.

In a case where If it is determined that there is CamApp control authority, communication unit 38A transmits the CamApp Package identified by the CamAppID to camera 20A identified by the acquired camera ID, and requests installation of CamApp (T93). Incidentally, when management server 30A receives the install request, App server authentication unit 35 may authenticate App server 40A. In a case where it is determined as legitimate App server 40A from a result of authentication, management server 30A may determine the presence or absence of the CamApp control authority.

In camera 20A to be installed, when communication unit 25 receives the install request of CamApp, CamApp management unit 21 issues an installation ID for identifying the installation of CamApp and installs CamApp using the CamApp Package. CamApp management unit 21 retains the installation ID and CamApp in association with each other. Incidentally, when receiving the install request of CamApp, management server authentication unit 24 may determine whether or not the installation can be set, for example, using the camera control authority control key written at the time of manufacture of camera 20A. Upon completion of the installation of the CamApp, communication unit 25 transmits the installation completion to App server 40A through management server 30A (T94). The installation completion information includes the installation ID.

In management server 30A, when communication unit 38A receives the installation completion information from camera 20A, CamApp management unit 39A issues the InstalledCamAppID and registers the installation information in table 63. The installation information includes an InstalledCamAppID, a contract ID, a CamAppID, a camera ID, and an installation ID. The installation ID is included in the installation completion information from camera 20A.

When the installation information is registered, communication unit 38A transmits the installation completion information to App server 40A (T95). The installation completion information includes the InstalledCamAppID.

In App server 40A, when communication unit 45 receives the installation completion information from management server 30A, it retains the InstalledCamAppID included in the installation completion information in control unit 42.

In App server 40A, communication unit 45 transmits the retained InstalledCamAppID to management server 30A, and requests activation of CamApp (T96).

In management server 30A, when communication unit 38A receives the activation request of CamApp from App server 40A, control request acceptance determination unit 39B determines whether or not App server 40A has the CamApp control authority. Specifically, control request acceptance determination unit 39B refers to table 63 and acquires the contract ID, the camera ID, and the installation ID associated with the InstalledCamAppID from App server 40A. Control request acceptance determination unit 39B determines the presence or absence of the CamApp control authority, depending on whether or not the acquired contract ID is retained in table 55A. If there is a contract ID corresponding to table 55A, it is determined that it has CamApp control authority: and if there is no contract ID corresponding to table 55A, it is determined that it does not have CamApp control authority. CamApp control authority is generated and retained by control authority management unit 37A.

In a case where one CamApp control authority is generated for each contract, control request acceptance determination unit 39B needs only to determine whether or not the contract ID is retained in table 55A. On the other hand, in a case where the CamApp control authority is generated for one contract and one camera, control request acceptance determination unit 39B determines whether or not the contract ID and the camera ID are retained in table 56A in association with one CamApp control authority ID. In this case, if there is the corresponding CamApp control authority ID, it is determined as having CamApp control authority; and if there is no corresponding CamApp control authority ID, it is determined as not having CamApp control authority.

In a case where it is determined as having CamApp control authority, CamApp management unit 39A transmits the acquired installation ID to camera 20A identified by the acquired camera ID, and requests the activation of CamApp (T97). Incidentally, when management server 30A receives the activation request, App server authentication unit 35 may authenticate App server 40A. In a case where it is determined as legitimate App server 40A from a result of authentication, management server 30A may determine the presence or absence of the CamApp control authority.

In camera 20A to be activated, when communication unit 25 receives the activation request of CamApp from management server 30A, application execution unit 28 activates the CamApp corresponding to the installation ID. Incidentally, when receiving the activation request of CamApp, management server authentication unit 24 may determine whether to permit activation by using, for example, the camera control authority control key written at the time of manufacturing camera 20A. Upon completion of the activation, communication unit 25 transmits an activation completion to App server 40A through management server 30A (T98 and T99).

After completion of activation of CamApp, App server 40A executes process of T45.

According to the App usage start procedure shown in FIG. 30. PC 10 can designate which CamApp is to be installed in which camera. User 7 is, for example, the owner of store 3 (for example, a shop or a restaurant), and sufficiently knows which camera image he or she wants to use for what purpose. Since user 7 designates camera 20A and CamApp to be installed by using PC 10, it is possible to install the CamApp reflecting user 7's intention.

Furthermore, by determining the presence or absence of CamApp control authority, management server 30A can perform control such that App server 40A can securely access through management server 30A without directly accessing camera 20A. This makes it possible to suppress, for example, unauthorized use of CamApp and modification of CamApp of, camera 20A.

Figure 31:
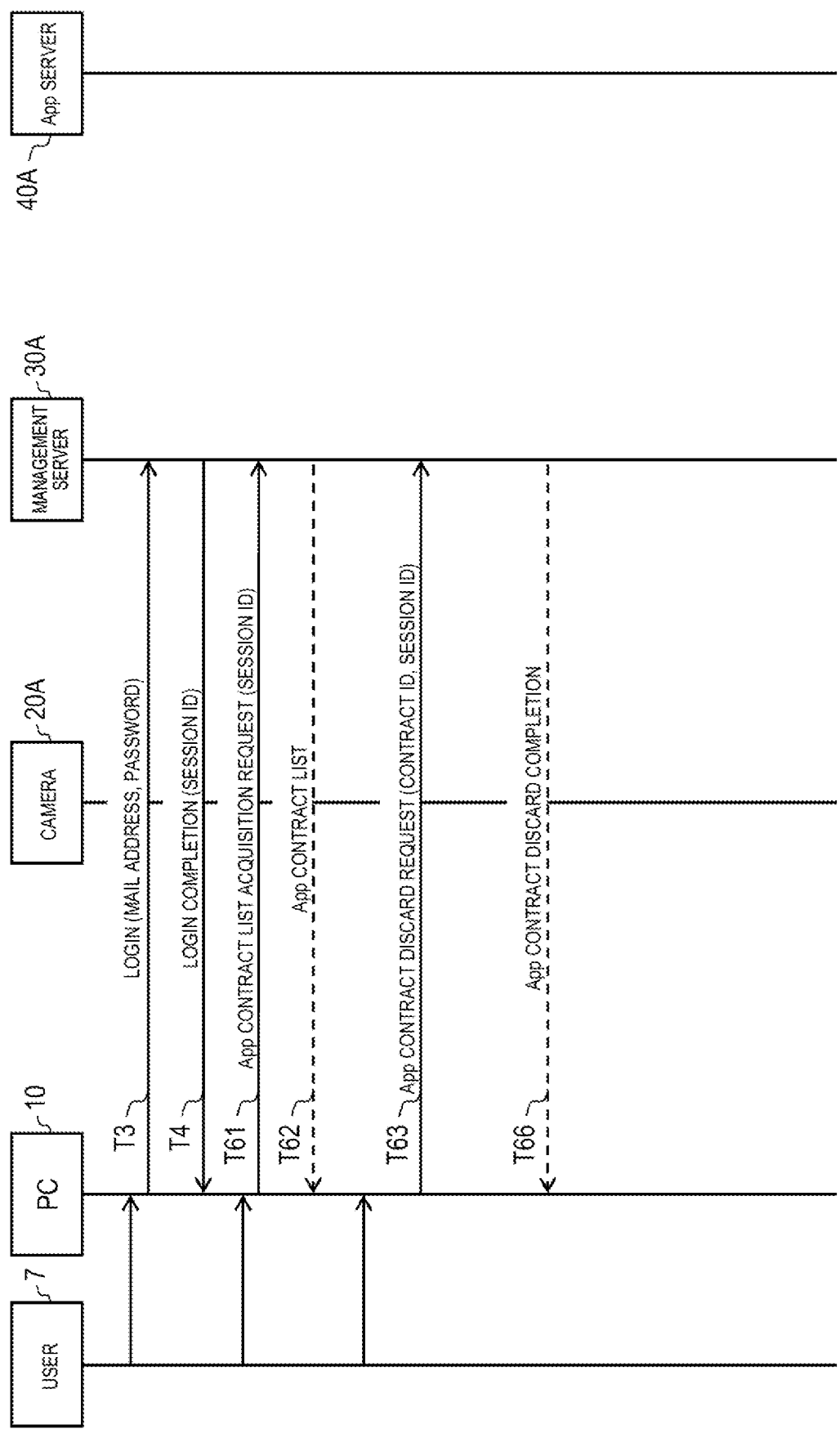
FIG. 31 is a sequence diagram showing an example of an App contract discard procedure by the camera system in the second exemplary embodiment.

FIG. 31 is a sequence diagram showing an example of App contract discard procedure by camera system 5A.

First, camera system 5A performs the processes of T3, T4, and T61 to T63.

After the process of T63, in management server 30A, control authority management unit 37A discards the CamApp control authority corresponding to the acquired contract ID retained therein. In this case, contract management unit 36 deletes the contract information corresponding to the acquired contract ID from table 55A. Further, in a case where CamApp control authority is generated for each contract and camera, control authority management unit 37A deletes information on CamApp control authority corresponding to the acquired contract ID from table 56A.

In the present exemplary embodiment, since camera 20A does not retain the CamApp control key, it is not necessary to make a request for discard of the CamApp control key to camera 20A. Communication unit 25 may request camera 20A to uninstall CamApp corresponding to the contract ID to be discarded from camera 20A.

Subsequently, camera system 5A executes the process of T66.

According to the App contract discard procedure shown in FIG. 31, with the termination of the App contract by camera 20A, management server 30A can discard the CamApp control authority relating to the CamApp for which contract is discarded. Accordingly, even in a case of acquiring the control request of CamApp from App server 40A, management server 30A cannot permit control over CamApp. Therefore, after the end of the App contract, it is possible to prevent camera 20A from being controlled using CamApp.

In the present exemplary embodiment, the user registration and camera registration procedure by camera system 5A and the App usage procedure are the same as in the first exemplary embodiment.

In this way, in camera system 5A, since management server 30A generates CamApp control authority and management server 30A itself manages it, it is not necessary to pass the CamApp control key to both camera 20A and App server 40A, and it is possible to suppress leakage of the CamApp control key to the outside. Therefore, management server 30A can manage the control over CamApp with higher safety.

Management server 30A accesses camera 20A, and App server 40A does not directly access camera 20A. Therefore, it is possible to reduce events that may occur in a case of being directly connected to camera 20A. For example, it is possible to suppress the possibility of freely controlling camera 20A. In addition, management server 30 may take countermeasures against communication connection through network address translation (NAT), and App server 40 does not need to recognize an NAT.

According to camera system 5A of the present exemplary embodiment, it is possible to realize a mechanism in which App server 40A controls camera 20A using CamApp safely and simply for the user.

In addition, the determination as to the presence or absence of CamApp control authority in the second exemplary embodiment may be performed as follows. (1) An AppID and an App server authentication key are sent during communication from App server 40A to management server 30A. (2) Subsequently, management server 30A refers to table 54 relating to the App and determines whether or not there is an entry (record) having both the sent AppID and App server authentication key at the same time. (3) Management server 30A refers to table 55A concerning a contract, extracts entries having "sent AppID", and generates a list of contract IDs of each entry. In a case where the entry is 0, it is determined that there is no CamApp authority. In a case where one App is contracted from multiple users, there are multiple contract IDs associated with the AppID. After the process of (3), the following (4A) and (5A) or (4B) and (5B) are performed.

[Case where CamApp Installation Instruction (Argument: CamAppID and Camera ID)]

(4A) Management server 30A refers to table 62 relating to CamApp and determines whether or not there is an entry having "CamAppID designated by an argument" and "sent AppID" at the same time. This process is performed in either a case of setting control authority for each contract or a case of setting control authority for each contract and for each camera. (5A) In the case of setting control authority for each contract and for each camera, management server 30A refers to table 56A relating to CamApp control authority, and determines whether or not there is an entry having both the contract ID included in the contract ID list generated in (3) and camera ID designated by an argument. In a case where there is the entry, management server 30A determines that App server 40A has the CamApp control authority.

[Case of Installed CamApp Control Instruction (Argument: InstalledCamAppID)]

(4B) Management server 30A refers to table 63 relating to installed CamApp, and determines whether or not there is an entry having both the InstalledCamAppID designated by an argument and the contract ID included in the contract ID list generated in (3) at the same time. In a case where there is the entry, management server 30A acquires the contract ID, the CamAppID, and the camera ID relating to the entry. (5B) Management server 30A refers to table 56A relating to the CamApp control authority and determines whether or not there is an entry having both the contract ID acquired at (4B) and the camera ID acquired at (4B) at the same time. In a case where there is the entry, management server 30A determines that App server 40A has the CamApp control authority.

Incidentally, even in the above (1), (2), and (3), it is divided into the case of a CamApp installation instruction and the case of an installed CamApp control instruction. In the case of the CamApp installation instruction, the arguments are AppID, App server authentication key, CamAppID, and camera ID. In the case of the installed CamApp control instruction, the arguments are AppID, App server authentication key, and InstalledCamAppID.

By the determination as to the presence or absence of the CamApp control authority, management server 30A can determine the presence or absence of the CamApp control authority, by checking that the App relating to the contract is definitely present.

In the present exemplary embodiment, it is described that in FIG. 30 App server 40A acquires the camera information from management server 30 using the contract ID or the like obtained from user 7, but the present invention is not limited thereto. For example, App server 40A may make a separate contract between App server 40A and management server 30A without using the contract ID or the like obtained from user 7, and acquire the camera information from management server 30A, based on a separate contract.

At this time, if management server 30A manages a contract with user 7 and a contract with App server 40A in association with each other, it is possible to determine whether or not App server 40A has CamApp control authority, based on the camera information (for example, whether or not camera information which is previously transmitted to App server 40A and camera information received at the time of reception of the control request from App server 40A match each other).

For example, it is assumed that App provider 9 collects metadata from a large number of camera 20A placed toward the sidewalk, gathers information on each hour, gender, and age, and transmits the data to a third party (provides a service). App provider 9 can acquire the camera information from management server 30A, based on a separate contract made between App server 40A and management server 30A. Therefore, App provider 9 can provide the service using camera 20A, even if it does not know anything about the contract between user 7 who is the owner of each camera and management server 30A.

On the other hand, CamApp control authority is generated on management server 30A side, for user 7, based on the contract between user 7 and management server 30A, and application control over camera 20A of user 7 under the CamApp control authority is managed. Therefore, it is possible to secure the safety in a case where camera 20A is used.

Third Exemplary Embodiment

Although the first and second exemplary embodiments exemplify the application control for cameras 20 and 20A, as in the third embodiment, the same may apply to the application control for terminal device 200 other than cameras 20 and 20A. That is, the contents of the first and second exemplary embodiments may be changed into contents in which camera 20 is replaced with terminal device 200. Further, camera 20 and terminal device 200 may be mixed.

In the third exemplary embodiment, in place of camera systems 5 and 5A, monitoring system 5B (not shown) is assumed. Comparing monitoring system 5B with camera systems 5 and 5A according to the first and second exemplary embodiments, monitoring system 5B is the same as camera systems 5 and 5A except for including terminal device 200 instead of camera 20. Monitoring system 5B may include terminal device 200 and camera 20.

Figure 32:
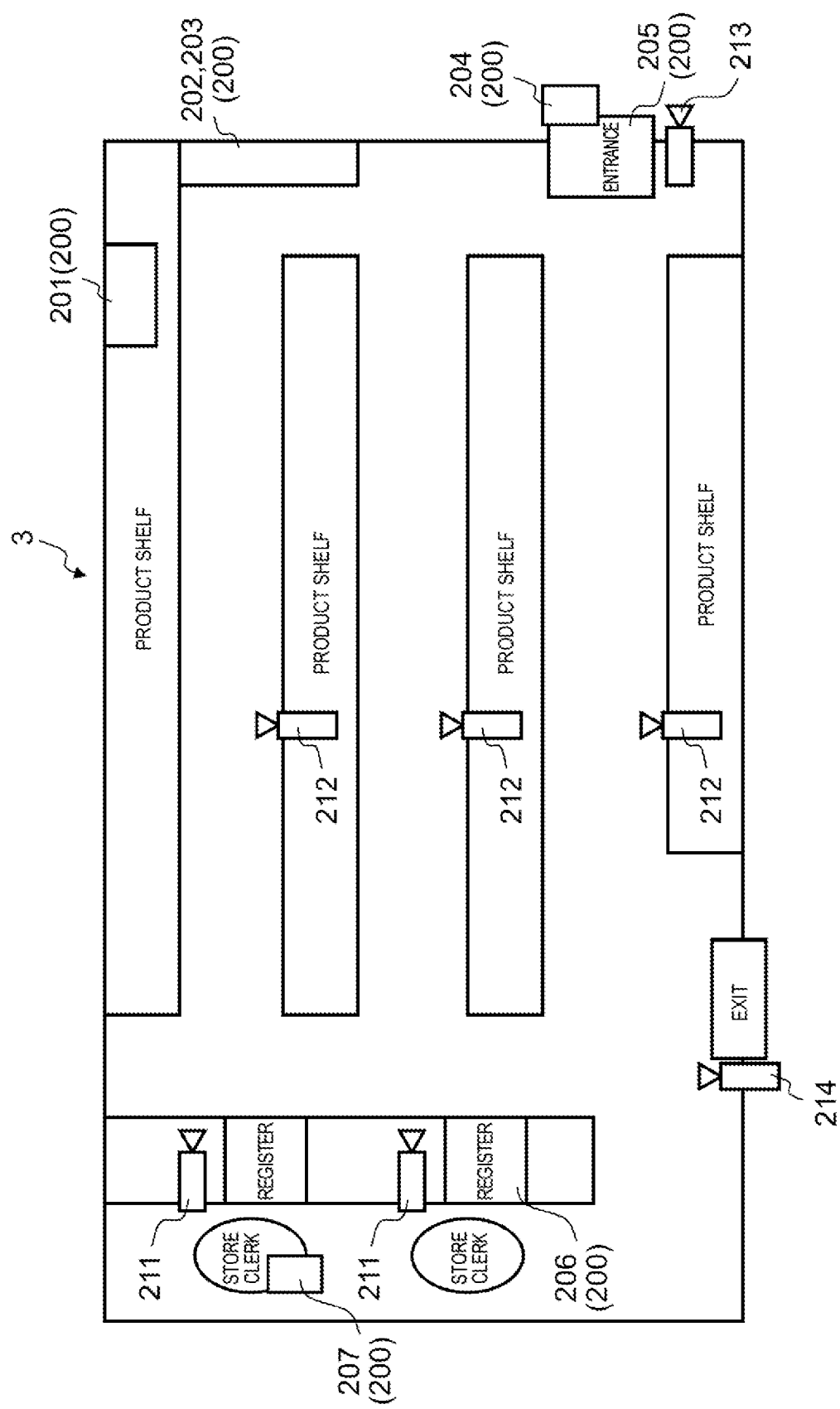
FIG. 32 is a schematic diagram showing an example of arrangement of terminal devices in a third exemplary embodiment.

FIG. 32 is a schematic diagram showing an example of arrangement of terminal devices 200 in store 3. Examples of each terminal device 200 include various sensors, various devices, portable terminal devices (for example, smartphones, and tablets). Further, one terminal device 200 may have a combination of at least one function of various sensors, various devices, and portable terminal devices.

In FIG. 32, as terminal device 200, speaker 201, air conditioning device 202, temperature sensor 203, video display device 204, door control device 205, input device 206, and smartphone 207 are illustrated. In addition, as camera 20, pre-registration camera 211 which is placed in front of the cash register, product-shelf camera 212 for capturing an image of a product shelf, entrance camera 213 for capturing an image of the vicinity of the entrance of store 3, and exit camera 214 for capturing an image of the vicinity of the exit of store 3 are exemplified.

In the third exemplary embodiment, the matters relating to camera 20 described in the first and second exemplary embodiments are also applicable to terminal device 200 other than camera 20.

Therefore, according to monitoring system 5B, as in the first exemplary embodiment, management server 30 can control the access authority (control authority) to terminal device 200, for App server 40. That is, management server 30 can easily provide a control authority of the application for terminal device 200 for specific terminal device 200, to specific App server 40, using the control key of the application for terminal device 200.

Further, according to monitoring system 5B, as in the second exemplary embodiment, management server 30A generates control authority of the application for terminal device 200, the management server 30A itself manages it. Therefore, monitoring system 5B does not need to pass the control key of the application for terminal device 200 to both terminal device 200 and App server 40A, and can prevent the control key of the application for terminal device 200 from leaking to the outside. Therefore, management server 30A can manage the control over the application for terminal device 200 with higher safety.

According to monitoring system 5B of the present exemplary embodiment, it is possible to realize a mechanism in which App servers 40 and 40A control terminal device 200 using an application for terminal device 200 safely and simply for user 7.

While various exemplary embodiments have been described with reference to the drawings, it is to be understood that the present disclosure is not limited thereto. It is apparent to those skilled in the art that changes or modifications are conceivable within the scope described in the claims, and it would be appreciated that those naturally belong to the technical scope of the present disclosure.

For example, App server 40 collects information from temperature sensor 203, each of cameras 20, and the input device 206, and calculates correlation among a customer base, a customer's staying time, sales, an in-store temperature, an in-store condition, and the like and a trend at every time zone. The owner of store 3 can refer to the above information with applications which are automatically installed in smartphone 207. In addition, monitoring system. 5B can also set limitation of visiting or the like by air-conditioning device 202 and door control device 205, using the above information, in order to keep the store to a better environment.

For example, depending on the setting of the owner of store 3, when the number of people in the store exceeds a certain value, door control device 205 locks the entrance door and video display device 204 displays a guidance that the store is crowded. Further, monitoring system 5B controls air conditioning device 202 such that it is the temperature preferred by the customer base, and causes the music corresponding to the customer base to flow from speaker 201, based on the information on the customer base trend at every time zone.

The third exemplary embodiment illustrates monitoring system 5B including terminal device 200 but the present invention is applicable to various application control systems including terminal device 200.

As described above, in the application control system in the above exemplary embodiment, the terminal device and the management device that manages control over the application for the terminal device are connected through the network. The management device generates a control key for controlling the application for the terminal device, and transmits the control key to the terminal device and a control device that retains the application for the terminal device and makes a control request for the application for the terminal device. The terminal device receives the control key from the management device and retains it, and receives the control key and the control request from the control device. The terminal device determines whether or not the retained control key and the control key from the control device match each other, and in a case where the control keys match each other, the terminal device controls the application for the terminal device corresponding to the control key, in response to the control request.

The application control system is, for example, monitoring system 5B. The terminal device is, for example, terminal device 200. The management device is, for example, management server 30. The control device is, for example, App server 40A.

Thus, by providing a management device that manages control over the application for the terminal device, separately from the control device that makes a control request for the application for the terminal device, it is possible to permit or reject the control request with high accuracy, by using the control key. For example, it is possible to easily set which control device is given a control authority for which terminal device and which terminal device application. In this way, a mechanism in which a control device controls a terminal device by using an application for the terminal device can be realized safely and easily for the user.

Further, the application control system may include an information processing device that designates a terminal device which is a transmission destination of the control key, and transmits first identification information for identifying the designated terminal device to the management device. The management device receives the first identification information, and transmits the control key to the terminal device identified by the first identification information. The terminal device identified by the first identification information may receive a control key from the management device and retain it.

The information processing device is, for example, PC 10. The first identification information is, for example, a terminal ID for identifying a terminal device.

This allows limiting the terminal device that transmits a control key. Thus, it is possible to permit a control request for the application for a terminal device, for example, only for some terminal devices possessed by the user, and separate the permission and rejection of the control request for each terminal device.

Further, the management device may transmit the first identification information to the control device. The terminal device identified by the first identification information may receive a control key, an application for a terminal device, and a control request, from the control device.

This allows limiting the terminal device that transmits various pieces of information from the control device. Accordingly, it is possible to reduce the amount of communication of data with relatively large amount such as an application for the terminal device, and effectively utilize network resources.

The management device may generate the control key for each contract relating to the application for the terminal device.

This makes it possible to generate a control key corresponding to the contract, and control the application in common for each contract.

Further, the management device may generate a control key for each terminal device.

This makes it possible to generate a control key corresponding to a terminal device, and permit or reject application control in various variations taking the terminal device into account.

The terminal device authenticates the management device, and in a case where the authentication is successful, it may retain a control key from the management device.

Thus, the terminal device authenticates the management device, thereby ensuring that requests and instructions from the management device are legitimate.

The application control system may also be provided with an information processing device that transmits a discard request for discarding the contract to the management device. The discard request may include second identification information for identifying a contract to be discarded. The management device may receive the discard request and transmit a discard notification for discarding the control key relating to the contract, in response to the discard request. The terminal device may discard the control key retained by the terminal device, in response to the discard notification.

Thus, with a simple process of discarding the control key retained by the terminal device, it is possible to disable control from the control device over the application for the terminal device installed in the terminal device. Therefore, the terminal device can suppress control from the control device over the application for the terminal device after the contract ends.

The control request may include an install request or an activation request of the application for the terminal device.

Thus, when the application for the terminal device is installed in the terminal device, or when the application for the terminal device retained by the terminal device is activated, in a case where there is a request from an invalid control device, the control request can be refused.

Further, the terminal device may capture an image, extract a predetermined feature from the captured image, and transmit the information on the extracted feature of the captured image to the control device.

Thus, the control device can collect features of the objects contained in the image captured by each terminal device, and analyze statistical information (for example, presence or absence of a specific person, tracking information of a specific person, presence or absence of a specific operation) according to the collected features.

In an application control system, a terminal device and a management device that manages control over an application for a terminal device are connected with each other through a network. The management device generates control authority for controlling the application for the terminal device, based on the contract relating to the application for the terminal device and the terminal device, and transmits terminal device identification information for identifying the terminal device relating to the contract, to a control device that makes a control request for the application for the terminal device. The management device acquires the control request and the terminal device identification information from the control device, and determines whether or not the control device has control authority, based on the terminal device identification information. In a case of having control authority, the management device transmits the control request to the terminal device identified by the terminal device identification information. The terminal device receives the control request from the management device, and controls the application for the terminal device in response to the control request.

The application control system is, for example, monitoring system 5B. The terminal device is, for example, terminal device 200. The management device is, for example, management server 30A. The control device is, for example, App server 40A. The terminal device identification information is, for example, a terminal ID for identifying a terminal device.

Thus, by providing a management device that manages control over the application for the terminal device separately from the control device that makes a control request for the application for the terminal device, it is possible to manage control authority without using the control key and permit or reject the control request with high accuracy. For example, it is possible to easily set which control device is given a control authority for which terminal device and which terminal device application. In this way, a mechanism in which a control device controls a terminal device by using an application for the terminal device can be realized safely and easily for the user. Further, since the control authority is not passed to other devices, it is possible to suppress leakage of control authority information and improve security.

The management device may also retain an application for the terminal device. The management device may receive, from the control device, the terminal device identification information, the control request, and third identification information for identifying the application for the terminal device. In a case where the control device has the control authority, the management device may transmit the control request and an application for a terminal device identified by the third identification information, to the terminal device identified by the terminal device identification information. The terminal device identified by the terminal device identification information may receive the control request and the application for a terminal device from the management device and control the application for the terminal device identified by the third identification information, in response to the control request. The third identification information is, for example, an ID for identifying an application for a terminal device.

Thus, it is possible to permit a control request for the application for a specific terminal device, for example, only for some terminal devices possessed by the user, and separate the permission and rejection of the control request for each terminal device.

Further, the management device may generate and retain a control authority for each contract of an application for the terminal device, and determine whether or not the control device has the control authority, depending on whether or not the retained terminal device identification information matches the terminal device identification information from the control device.

This makes it possible to generate a control authority corresponding to the contract, and control the application in common for each contract.

Further, the management device may retain the terminal device identification information, generate and retain control authority for each contract of an application for the terminal device and for each terminal device, and acquire the control request and the terminal device identification information from the control device. The management device may determine whether or not the control device has the control authority, depending on whether or not the retained terminal device identification information matches the terminal device identification information from the control device.

This makes it possible to generate control authority corresponding to a contract and a terminal device, and permit or reject application control in various variations taking the terminal device into account.

Further, the management device may authenticate the control device, and determine whether or not the control device has the control authority in a case where the authentication succeeds.

Thus, the management device authenticates the control device, thereby ensuring that requests and instructions from the control device are legitimate.

The application control system may also be provided with an information processing device that transmits a discard request for discarding the contract to the management device. The discard request may include fourth identification information for identifying a contract to be discarded. The management device may receive the discard request and discard the control authority in response to the discard request. The fourth identification information is, for example, a contract ID.

Thus, with a simple process of discarding the control authority retained by the management device, it is possible to disable control from the control device over the application for the terminal device installed in the terminal device. Therefore, the management device can suppress control from the control device over the application for the control device after the contract ends.

The terminal device may also receive an application for the terminal device from the management device. The control request may include an install request or an activation request of the application for the terminal device.

Thus, when the application for the terminal device is installed in the terminal device, or when the application for the terminal device retained by the terminal device is activated, in a case where there is a request from an invalid control device, the control request can be refused.

Further, the terminal device may capture an image, extract a predetermined feature from the captured image, and transmit the information on the extracted feature of the captured image to the control device.

Thus, the control device can collect features of the objects contained in the image captured by each terminal device, and analyze statistical information (for example, presence or absence of a specific person, tracking information of a specific person, presence or absence of a specific operation) according to the collected features.

Further, the terminal device may include a sensor that detects various events, a device that performs various processes, or a portable terminal device.

Accordingly, it is possible to manage the control over the applications for various sensors, devices, and portable terminal devices, and permit or reject the control request for the applications with high accuracy.

The application control method in the above exemplary embodiment is a method in an application control system in which a terminal device and a management device that manages control over an application for the terminal device are connected with each other through a network. In this method, a control key for controlling an application for the terminal device is generated by the management device, the control key is transmitted to the terminal device, and a control device that retains the application for the terminal device and makes a control request for the application for the terminal device, by the management device, the control key is received and retained from the management device, by the terminal device, the control key and the control request are received from the control device, by the terminal device, whether or not the retained control key and the control key from the control device match one another is determined by the terminal device, and in a case where the control keys match one another, the application for the terminal device corresponding to the control key is controlled in response to the control request, by the terminal device.

Thus, by providing a management device that manages control over the application for the terminal device, separately from the control device that makes a control request for the application for the terminal device, it is possible to permit or reject the control request with high accuracy, by using the control key. For example, it is possible to easily set which control device is given a control authority for which terminal device and which terminal device application. In this way, a mechanism in which a control device controls a terminal device by using an application for the terminal device can be realized safely and easily for the user.

The application control method in the above exemplary embodiment is a method in an application control system in which a terminal device and a management device that manages control over an application for the terminal device are connected with each other through a network. In this method, control authority for controlling an application for the terminal device is generated based on a contract relating to the application for the terminal device and the terminal device, by the management device, terminal device identification information for identifying the terminal device relating to the contract is transmitted to a control device that makes a control request for the application for the terminal device, by the management device, the control request and the terminal device identification information are acquired from the control device, by the management device, whether or not the control device has the control authority is determined based on the terminal device identification information, by the management device, the control request is transmitted to the terminal device identified by the terminal device identification information, in a case where the control device has the control authority, by the management device, the control request from the management device is received by the terminal device, and the application for the terminal device is controlled in response to the control request, by the terminal device.

Thus, by providing a management device that manages control over the application for the terminal device separately from the control device that makes a control request for the application for the terminal device, it is possible to manage control authority without using the control key and permit or reject the control request with high accuracy. For example, it is possible to easily set which control device is given a control authority for which terminal device and which terminal device application. In this way, a mechanism in which a control device controls a terminal device by using an application for the terminal device can be realized safely and easily for the user. Further, since the control authority is not passed to other devices, it is possible to suppress leakage of control authority information and improve security

INDUSTRIAL APPLICABILITY

The present disclosure is useful for an application control system and an application control method capable of improving the safety and operability of an application control, by a control device that makes a control request to an application, over a terminal device.

REFERENCE MARKS IN THE DRAWINGS

3 STORE
5, 5A CAMERA SYSTEM
7 USER
8 NETWORK
9 APP PROVIDER
10, 10A PC
12, 12A WEB BROWSER FUNCTION UNIT
14, 14A INPUT DEVICE
15, 15A DISPLAY
20, 20a, 20b, 20c, 20A CAMERA
21 CamApp MANAGEMENT UNIT
22 CONTROL AUTHORITY MANAGEMENT UNIT
23 CONTROL REQUEST ACCEPTANCE DETERMINATION UNIT
24 MANAGEMENT SERVER AUTHENTICATION UNIT
25 COMMUNICATION UNIT
26 CAMERA IMAGE DELIVERY UNIT
27 IMAGE CAPTURE UNIT
28 APPLICATION EXECUTION UNIT
30, 30A MANAGEMENT SERVER
31 USER MANAGEMENT UNIT
32 CAMERA MANAGEMENT UNIT
33 App PROVIDER MANAGEMENT UNIT
34 App MANAGEMENT UNIT
35 App SERVER AUTHENTICATION UNIT
36 CONTRACT MANAGEMENT UNIT
37, 37A CONTROL AUTHORITY MANAGEMENT UNIT
38, 38A COMMUNICATION UNIT
39A CamApp MANAGEMENT UNIT
39B CONTROL REQUEST ACCEPTANCE DETERMINATION UNIT
39C INSTALLED CamApp MANAGEMENT UNIT
40, 40A App SERVER
41 CamApp MANAGEMENT UNIT
42 CONTROL UNIT
45 COMMUNICATION UNIT
46 STATISTICAL INFORMATION MANAGEMENT UNIT
51, 52, 53, 54, 55, 62, 63 TABLE
60 SETTING GUI
61,64 PULL-DOWN MENU
200 TERMINAL DEVICE
201 SPEAKER
202 AIR CONDITIONING DEVICE
203 TEMPERATURE SENSOR
204 VIDEO DISPLAY DEVICE
205 DOOR CONTROL DEVICE
206 INPUT DEVICE
207 SMARTPHONE
211 PRE-REGISTRATION CAMERA
212 PRODUCT-SHELF CAMERA
213 ENTRANCE CAMERA
214 EXIT CAMERA

The invention claimed is:
1. An application control system comprising:
   a terminal device; and
   a management device that, in operation, manages control over an application for the terminal device,
   the terminal device and the management device being connected with each other through a network,
   wherein the management device, in operation,
   generates a control key for controlling the application for the terminal device, and
   transmits the control key, to the terminal device, and to a control device that retains the application for the terminal device and makes a control request for the application for the terminal device, and
   wherein the terminal device, in operation,
   receives and retains the control key from the management device,
   receives the control key and the control request from the control device,
   determines whether or not the retained control key and the control key from the control device match one another, and
   in a case where the control keys match one another, controls the application for the terminal device corresponding to the control key, in response to the control request.
2. The application control system of claim 1, further comprising:
   an information processing device that, in operation, designates the terminal device which is a transmission destination of the control key, and transmits first identification information for identifying the designated terminal device to the management device,
   wherein the management device, in operation, receives the first identification information, and transmits the control key to the terminal device identified by the first identification information, and
   wherein the terminal device identified by the first identification information, in operation, receives and retains the control key from the management device.
3. The application control system of claim 2,
   wherein the management device, in operation, transmits the first identification information to the control device, and
   wherein the terminal device identified by the first identification information, in operation, receives from the control device, the control key, the application for the terminal device, and the control request.
4. The application control system of claim 1,
   wherein the management device, in operation, generates the control key for each contract relating to the application for the terminal device.
5. The application control system of claim 1,
   wherein the management device, in operation, generates the control key for each terminal device.
6. The application control system of claim 1,
   wherein the terminal device, in operation, authenticates the management device, and retains the control key from the management device, in a case where the authentication succeeds.

7. The application control system of claim 4, further comprising:
an information processing device that, in operation, transmits a discard request for discarding a contract relating to the application for the terminal device, to the management device,
wherein the discard request includes second identification information for identifying a contract to be discarded,
wherein the management device, in operation, receives the discard request, and transmits a discard notification for discarding the control key relating to the contract, in response to the discard request, and
wherein the terminal device, in operation, discards the control key retained by the terminal device, in response to the discard notification.

8. The application control system of claim 1,
wherein the terminal device, in operation, receives the application for the terminal device from the control device, and
wherein the control request includes an install request or an activation request of the application for the terminal device.

9. The application control system of claim 1,
wherein the terminal device, in operation,
captures an image,
extracts a predetermined feature from the captured image, and
transmits information on the extracted feature of the captured image to the control device.

10. An application control system comprising:
a terminal device; and
a management device that, in operation, manages control over an application for the terminal device,
the terminal device and the management device being connected with each other through a network,
wherein the management device, in operation,
generates control authority for controlling an application for the terminal device, based on a contract relating to the application for the terminal device and the terminal device,
transmits terminal device identification information for identifying the terminal device relating to the contract, to a control device that makes a control request for the application for the terminal device,
acquires the control request and the terminal device identification information from the control device,
determines whether or not the control device has the control authority related to the contract, based on the terminal device identification information, and
transmits the control request to the terminal device identified by the terminal device identification information, in a case where the control device has the control authority, and
wherein the terminal device, in operation,
receives the control request from the management device, and
controls the application for the terminal device in response to the control request.

11. The application control system of claim 10,
wherein the management device, in operation,
retains the application for the terminal device,
receives, from the control device, the terminal device identification information, the control request, and third identification information for identifying the application for the terminal device, and
transmits the control request and an application for a terminal device identified by the third identification information, to the terminal device identified by the terminal device identification information, in a case where the control device has the control authority, and
wherein the terminal device identified by the terminal device identification information, in operation,
receives the control request and the application for the terminal device, from the management device, and
controls the application for the terminal device identified by the third identification information, in response to the control request.

12. The application control system of claim 10,
wherein the management device, in operation,
generates the control authority, for each contract of the application for the terminal device, and
determines whether or not the control device has the control authority, depending on whether or not the retained terminal device identification information matches the terminal device identification information from the control device.

13. The application control system of claim 10,
wherein the management device, in operation,
retains the terminal device identification information,
generates the control authority, for each contract of the application for the terminal device and for each terminal device,
acquires the control request and the terminal device identification information from the control device, and
determines whether or not the control device has the control authority, depending on whether or not the retained terminal device identification information matches the terminal device identification information from the control device.

14. The application control system of claim 10,
wherein the management device, in operation, authenticates the control device, and determines whether or not the control device has the control authority in a case where the authentication succeeds.

15. The application control system of claim 10, further comprising:
an information processing device that, in operation, transmits a discard request for discarding the contract to the management device,
wherein the discard request includes fourth identification information for identifying a contract to be discarded, and
wherein the management device, in operation,
receives the discard request, and
discards the control authority in response to the discard request.

16. The application control system of claim 10,
wherein the terminal device, in operation, receives the application for the terminal device from the management device, and
wherein the control request includes an install request or an activation request of the application for the terminal device.

17. The application control system of claim 10,
wherein the terminal device, in operation,
captures an image,
extracts a predetermined feature from the captured image, and
transmits information on the extracted feature of the captured image to the control device.

18. The application control system of claim 1,
wherein the terminal device includes a sensor that detects various events, a device that performs various processes, or a portable terminal device.

19. An application control method in an application control system in which a terminal device and a management device that, in operation, manages control over an application for the terminal device, are connected with each other through a network, the method comprising:

generating by the management device a control key for controlling the application for the terminal device;

transmitting from the management device, the control key to the terminal device and to a control device that retains the application for the terminal device and makes a control request for the application for the terminal device;

receiving and retaining by the terminal device the control key from the management device;

receiving by the terminal device the control key and the control request from the control device;

determining by the terminal device whether or not the retained control key and the control key from the control device match one another, and in a case where the control keys match one another, controlling by the terminal device the application for the terminal device corresponding to the control key, in response to the control request.

20. An application control method in an application control system in which a terminal device and a management device that, in operation, manages control over an application for the terminal device, are connected with each other through a network, the method comprising:

generating by the management device control authority for controlling an application for the terminal device, based on a contract relating to the application for the terminal device and the terminal device;

transmitting by the management device, terminal device identification information for identifying the terminal device relating to the contract to a control device that makes a control request for the application for the terminal device;

acquiring by the management device the control request and the terminal device identification information from the control device;

determining by the management device whether or not the control device has the control authority related to the contract, based on the terminal device identification information;

transmitting by the management device the control request to the terminal device identified by the terminal device identification information, in a case where the control device has the control authority, receiving by the terminal device the control request from the management device; and controlling by the terminal device the application for the terminal device, in response to the control request.

* * * * *